(12) United States Patent
Dwivedi et al.

(10) Patent No.: US 11,568,625 B2
(45) Date of Patent: Jan. 31, 2023

(54) TARGETED OBJECT DETECTION IN IMAGE PROCESSING APPLICATIONS

(71) Applicant: NVIDIA Corporation, Santa Clara, CA (US)

(72) Inventors: Shekhar Dwivedi, Santa Clara, CA (US); Gigon Bae, Mountain View, CA (US)

(73) Assignee: Nvidia Corporation, Santa Clara, CA (US)

( * ) Notice: Subject to any disclaimer, the term of this patent is extended or adjusted under 35 U.S.C. 154(b) by 101 days.

(21) Appl. No.: 17/248,069

(22) Filed: Jan. 7, 2021

(65) Prior Publication Data

US 2022/0215201 A1 Jul. 7, 2022

(51) Int. Cl.
| | |
|---|---|
| G06K 9/00 | (2022.01) |
| G06V 10/25 | (2022.01) |
| G06K 9/62 | (2022.01) |
| G06T 7/00 | (2017.01) |
| G06N 3/08 | (2006.01) |
| G06T 7/11 | (2017.01) |

(52) U.S. Cl.
CPC ........... *G06V 10/25* (2022.01); *G06K 9/6256* (2013.01); *G06N 3/08* (2013.01); *G06T 7/0014* (2013.01); *G06T 7/11* (2017.01); *G06T 2207/20081* (2013.01); *G06T 2207/20084* (2013.01); *G06T 2207/30008* (2013.01)

(58) Field of Classification Search
CPC ........ G06V 10/25; G06K 9/6256; G06N 3/08; G06T 7/0014; G06T 7/11; G06T 2207/20081; G06T 2207/20084; G06T 2207/30008
See application file for complete search history.

(56) References Cited

U.S. PATENT DOCUMENTS

| | | | |
|---|---|---|---|
| 2020/0268339 A1* | 8/2020 | Hao | A61B 6/0492 |
| 2020/0294257 A1* | 9/2020 | Yoo | G06V 10/82 |
| 2020/0324795 A1* | 10/2020 | Bojarski | B60W 60/00274 |
| 2022/0076133 A1* | 3/2022 | Yang | G06N 3/088 |

FOREIGN PATENT DOCUMENTS

| | | | |
|---|---|---|---|
| DE | 112004001468 B4 | 8/2017 | |
| WO | WO-2021210723 A1 * | 10/2021 | A61B 6/14 |

OTHER PUBLICATIONS

Liu, L., Zhang, B., Wang, H.: Organ localization in peUct images using hierarchical conditional faster r-cnn method. In: Proceedings of the Third International Symposium on Image Computing and Digital Medicine. 2019. pp. 249-253. doi 10.1145/3364836. 3364886.

(Continued)

*Primary Examiner* — Xin Jia
(74) *Attorney, Agent, or Firm* — Lowenstein Sandler LLP

(57) ABSTRACT

Apparatuses, systems, and techniques to train and apply a first machine learning model to identify a plurality of regions of interest within an input image, and to train and apply a plurality of second machine learning models to identify one or more objects within each region of interest identified by the first machine learning model.

23 Claims, 11 Drawing Sheets

(56) References Cited

OTHER PUBLICATIONS

Mikolajczyk, K., Schmid, C., Zisserman, A.: Human detection based on a probabilistic assembly of robust part detectors. In: European conference on i computer vision. Springer, Berlin, Heidelberg, 2004. pp. 69-82. doi: 10.1007/978-' 3-540-24670-1 _6.

Xu, X., et al.: Efficient multiple organ localization in CT image using 30 region proposal network. In: IEEE transactions on medical imaging, 2019, 38. Jg., Nr. 8, pp. 1885-1898. doi: 10.1109/TMI.2019.2894854.

Zhang, N., et al.: Part-based R-CNNs for fine-grained category detection. In: I European conference on computer vision. Springer, Cham, 2014. pp. 834-849. doi: 10.1007/978-3-319-10590-1_54.

Jiang, G., Wang, Z., Liu, H.: Automatic detection of crop rows based on multi-ROIs. In: Expert systems with applications, 2015, 42. Jg., Nr. 5, pp. 2429-2441. doi: 10.1016/j.eswa.2014.10.033.

Lei, Y., et al.: Multi-organ segmentation in head and neck MRI using U-Faster-RCNN. In: Medical Imaging 2020: Image Processing. SPIE, 2020. pp. 826-831. doi: 10.1117/12.2549596.

Donner, R., et al.: Global localization of 30 anatomical structures by pre-filtered. Hough Forests and discrete optimization. In: Medical image analysis, 2013,17. Jg., Nr. 8, pp. 1304-1314. doi: 10.1016/j.media.2013.02.004.

Office Action for German Patent Application No. 102021133631.7, dated Jul. 29, 2022, 15 pages. *Best available copy*.

\* cited by examiner

TARGETED OBJECT DETECTION IN IMAGE PROCESSING APPLICATIONS

TECHNICAL FIELD

At least one embodiment pertains to processing resources used to perform and facilitate artificial intelligence. For example, at least one embodiment pertains to operations encountered in training and using machine learning models for efficient image processing and object detection, according to various novel techniques described herein.

BACKGROUND

Machine learning is often applied to image processing, such as identification of objects depicted within images. Object identification is used in medical imaging, science research, autonomous driving systems, robotic automation, security applications, law enforcement practices, and many other settings. Machine learning involves training a computing system—using training images and other training data—to identify patterns in images that may facilitate object identification. Training can be supervised or unsupervised. Machine learning models can use various computational algorithms, such as decision tree algorithms (or other rule-based algorithms), artificial neural networks, and the like. During inference stage, a new image is input into a trained machine learning model and various target objects of interest (e.g., vehicles in an image of a roadway) can be identified using patterns and features identified during training.

DETAILED DESCRIPTION

Figure 1A:
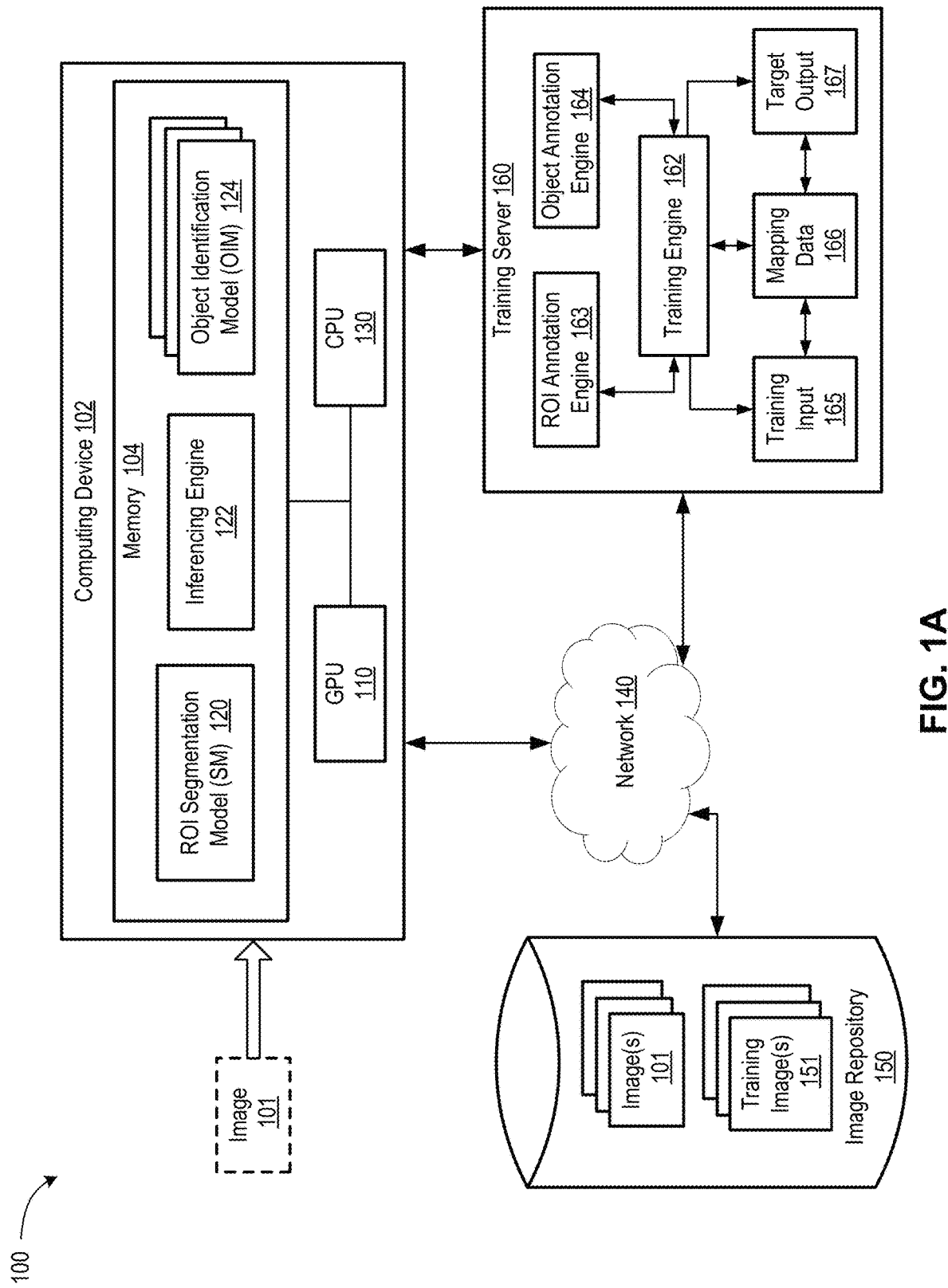
FIG. 1A is a block diagram of an example computer system that uses machine learning for image segmentation into regions of interest and efficient object identification, in accordance with at least some embodiments.

Automated object recognition is used in numerous technologies and industries, including but not limited to medical imaging, autonomous driving/parking systems, autonomous robot/machine operation, face recognition, manufacturing quality control, alphanumeric character recognition, robotic technologies, and many other applications. In one example, object recognition can be used in medical diagnostics that involves computer tomography (CT), magnetic resonance imaging (MRI), positron emission tomography (PET), single-photon emission computed tomography (SPECT), ultrasound imaging, and the like. Modern imaging techniques often produce images of large parts of patients' bodies, which can include multiple organs. Computer-based object recognition techniques can be used to identify pathologies (or absence thereof) of various organs and tissues depicted by the images. Object recognition techniques can involve training machine learning models (MLMs) based on multiple training images of healthy and abnormal organs and tissues. Trained MLMs can use large images (in some instances depicting a whole body or a large portion of the body of a patient) and identify presence of a tumor in the patient's bowels, infection in the patient's lungs, or any other pathological condition.

Training existing MLMs using images that include large medical volumes can be a time-consuming process that can take several days (or longer). In many situations, however, a medical professional performing diagnostics is interested in a state of a particular organ (e.g., heart or liver) that represents a relatively small fraction (e.g., 5%, 10%, 20%, etc.) of the total image. As a result, both during the training stage and the inference stage (when new images are input into the MLM), the MLM may be processing large volumes of data that are not relevant for diagnostics purposes. On the other hand, simply dividing large images into smaller sub-images may not always be possible as different patients can have variations in sizes and locations of their different organs (or cars and other objects or road users may have unpredictable locations along the roadway). As a result, a purely size-based segmentation can, in some instances, exclude parts of targeted organs (ROIs) while, in other instances, capture parts of adjacent organs that can appear as artifacts or trigger generation of false-positive diagnostic results.

Aspects and embodiments of the present disclosure address these and other technological challenges by disclosing methods and systems that enable segmentation of large images into smaller regions of interest (ROIs) and performing object identification within segmented ROIs. In at least one embodiment, during a first stage, ROIs (e.g., organs of a patient, vehicles/pedestrians on or near a roadway, robot/objects in a factory or warehouse) are determined within a large image, by using geometric relationships (identified during training) between locations of the ROIs and various reference features that can be common to all (or most) targets (e.g., images of patients or traffic situations). In one non-limiting example, one or more characteristics of a bone structure visible within the image can be used as such reference features—locations of the lowest/highest bone points, parts of the bone structure that are relatively isolated from other bones, reference lines connecting certain bones/points, geometric relationships within the bones, and the like. Geometric relationships can reflect likely locations of various ROIs relative to the reference features. For example, lungs can be located within a certain part of an area defined between the top of the pelvic bone and the top of the rib-cage (in vertical/transverse direction), and within a certain area between the left and right edges of the ribcage (in horizontal/sagittal direction). During the inference stage, a large input image can be segmented into one or more ROIs, using the MLM trained to determine locations of ROIs. A second set of trained MLMs can then be used to identify objects of interest within the individual ROIs (e.g., lesions, sub-parts/lobes of organs of interest, etc.). The second set of MLMs can be trained on ROI-specific images of smaller sizes that depict respective ROIs and annotate objects within the ROIs. For example, training a heart-specific second MLM can be accomplished using one or more training images of a heart annotated with locations of various parts of the heart, such as ventricles, atria, valves, heart muscles, and so on. In at least one embodiment, training mages for the second set of MLMs may be ROI-specific images that exclude other ROIs. In at least one embodiment, training images for the second set of MLMs may be larger images that include two (or more) annotation levels, e.g., higher-level ROI annotations, and lower-level object annotations within each ROI.

Although throughout this disclosure various concepts are illustrated using medical imaging examples, substantially the same or similar concepts can be used for object recognition in other contexts, such as object identification in driving or industrial environments, object recognition in security applications, in scientific and investigative research, as well as in many other applications.

System Architecture

FIG. 1A is a block diagram of an example computer system 100 that uses machine learning for image segmentation into regions of interest and efficient object identification, in accordance with at least some embodiments. As depicted in FIG. 1A, a computing system 100 can include a computing device 102, an image repository 150, and a training server 160 connected to a network 140. Network 140 may be a public network (e.g., the Internet), a private network (e.g., a local area network (LAN), or wide area network (WAN)), a wireless network, a personal area network (PAN), or a combination thereof.

Computing device 102 may be a desktop computer, a laptop computer, a smartphone, a tablet computer, a server, or any suitable computing device capable of performing the techniques described herein. Computing device 102 can may be configured to receive an image 101. Image 101 may be generated by one or more devices connected to the computing device 102. For example, devices capable of generating image 101 can be medical imaging devices (e.g., CT, MRI, PET, SPECT, etc., scanners), autonomous vehicle sensing devices (e.g., lidars, radars, long- and mid-range cameras), video recorders, photographic equipment, scanners, video, and the like. Image 101 may be a medical image, an image of an automotive environment, an image of a person or a group of people, an image of a natural or artificial (e.g., outdoor or indoor) scenery, an image of a text or any other collection of alphanumeric characters, or any other type of image. Image 101 may be in any digital (e.g., pixel-based or vector-based) format, including but not limited to JPEG, GIF, PNG, BMP, TIFF, CIB, DIMAP, NITF, and so on. Image 101 may be stored (e.g., together with other images) in image repository 150. Additionally, image repository 150 may store training images 151 for training one or more MLMs for ROI segmentation and object identification, according to some embodiments disclosed herein. Image repository 150 can be accessed by computing device 102 directly or (as shown) via network 140.

Image repository 150 may be a persistent storage capable of storing images as well as metadata for the stored images. Image repository 150 may be hosted by one or more storage devices, such as main memory, magnetic or optical storage based disks, tapes or hard drives, NAS, SAN, and so forth. Although depicted as separate from computing device 102, in at least one embodiment image repository 150 may be a part of computing device 102. In at least some embodiments, image repository 150 may be a network-attached file server, while in other embodiments image repository 150 may be some other type of persistent storage such as an object-oriented database, a relational database, and so forth, that may be hosted by a server machine or one or more different machines coupled to the computing device 102 via network 140.

Computing device 102 may include a memory 104 communicatively coupled with one or more processing devices, such as one or more graphics processing units (GPU) 110 and one or more central processing units (CPU) 130. Memory 104 can store one or more MLMs, such as ROI segmentation model (SM) 120 and one or more object identification models (OIMs) 124. Computing device 102 may host an inferencing engine 122 to run SM 120 and one or more OIMs 124. Inferencing engine 122 may be executed by GPU 110 and/or CPU 130. Inferencing engine 122 can use image 101 (or training image 151) as input for SM 120 trained to identify one or more ROIs (e.g., liver, heart, lungs, and the like, within a medical CT image). Inferencing engine 122 may then use each identified ROIs as input for a respective one of OIMs 124 trained to identify one or more objects of interest (or an absence thereof) within the respective ROIs, such as anatomical features, lesions, tumors, blood vessels, and the like. In at least one embodiment, one or more of SM 120 and/or OIM 124 may be a model that includes a neural network.

SM 120 and/or one or more OIMs 124 may be trained by a training server 160. In at least one embodiment, training server 160 may be a part of computing device 102. In other embodiments, training server 160 may be communicatively coupled to computing device 102 directly or via network 140. Training server 160 may be (and/or include) a rack-mount server, a router computer, a personal computer, a laptop computer, a tablet computer, a desktop computer, a media center, or any combination thereof. Training server 160 may include a training engine 162. In at least one embodiment, training engine 162 may generate one or more machine learning models (e.g., SM 120 and OIM 124). The generated MLMs may be trained by training engine 162 using training data that may include training input(s) 165 and corresponding target output(s) 167. In at least one embodiment, different MLMs can be trained separately for different types of images. For example, gallbladder-specific OIM can be trained separately from kidney-specific OIM using gallbladder-related images and kidney-related images respectively.

For training of SM 120, training input(s) 165 may include one or more training images 151 and various metadata for the training images 151. Training images 151 may be large-scale images, such as images of an entire medical volume, panoramic images of an automotive environment, and the like. A ROI annotation engine 163 may annotate large-scale images with indications (e.g., bounding boxes or other bounding shapes such as spheroids, ellipsoids, cylindrical shapes, etc.) of the corresponding ROIs (organs in a medical image, vehicles in an automotive environment, and the like) and generate target output(s) 167, which may be training input(s) 165 with ROI annotations. Additionally, training engine 162 may generate mapping data 166 (e.g., metadata) that associates training input(s) 165 with correct target output(s) 167. During training of SM 120, training engine 162 may identify patterns in training input(s) 165 based on desired target output(s) 167 and train SM 120 to perform ROI segmentation using the identified patterns. Predictive utility of the identified patterns may be subsequently verified using additional training input/target output associations and then used, during inference stage, by SM 120, in future processing of new images. For example, upon receiving a new image of a patient's abdomen, trained SM 120 may identify various ROIs, such as left and right kidneys, pancreas, duodenum, spleen, and so on.

Similarly, for training one or more OIMs 124, an object annotation engine 164 may annotate images of the ROIs (ROI-level training input(s) 165) with indications (e.g., pointers, bounding boxes, etc.) of various target objects (tumors, aneurisms, dilations, and other forms of pathology) within ROIs and generate respective ROI-level target output(s) 167 (e.g., by adding ROI annotations to training input(s) 165). In at least one embodiment, training input(s) 165 can be generated from large-scale images by taking subsets thereof that correspond to ROIs. Training engine 162 can also generate mapping data 166 that associates ROI-level training input(s) 165 with correct ROI-level target output(s) 167. During training of one or more OIMs 124, patterns in ROI-level training input(s) 165 can be identified based on desired ROI-level target output(s) 167 and used to perform object identification within the respective ROI using identified ROI-level patterns. The identified patterns may be verified subsequently using additional training (testing) input/target output associations. Based on the identified/verified patterns, trained OIMs 124 then process new images during the inference stage. For example, upon receiving a new image 101, performing ROI segmentation with SM 120, and identifying a gallbladder ROI, a trained gallbladder-specific OIM 124 may be deployed to identify various objects within the gallbladder ROI, such as stones, inflammations, obstructions, and so on.

In at least one embodiment, each or some of SMs 120 and OIMs 124 may be implemented as deep learning neural networks having multiple levels of linear or non-linear operations. For example, each or some of SMs 120 and OIMs 124 may be convolutional neural networks, recurrent neural networks (RNN), fully connected neural networks, and so on. In at least one embodiment, each or some of SMs 120 and OIMs 124 may include multiple neurons wherein each neuron may receive its input from other neurons or from an external source and may produce an output by applying an activation function to the sum of (trainable) weighted inputs and a bias value. In at least one embodiment, each or some of SM 120 and OIM 124 may include multiple neurons arranged in layers, including an input layer, one or more hidden layers, and an output layer. Neurons from adjacent layers may be connected by weighted edges. Initially, edge weights may be assigned some starting (e.g., random) values. For every training input 165, training engine 162 may cause each or some of SM 120 and OIM 124 to generate output(s). Training engine 137 may then compare observed output(s) with the desired target output(s) 167. The resulting error or mismatch, e.g., the difference between the desired target output(s) 167 and the actual output(s) of the neural networks, may be back-propagated through the respective neural networks, and the weights in the neural networks may be adjusted to make the actual outputs closer to the target outputs. This adjustment may be repeated until the output error for a given training input 165 satisfies a predetermined condition (e.g., falls below a predetermined value). Subsequently, a different training input 165 may be selected, a new output generated, and a new series of adjustments implemented, until the respective neural networks are trained to an acceptable degree of accuracy.

Figure 1B:
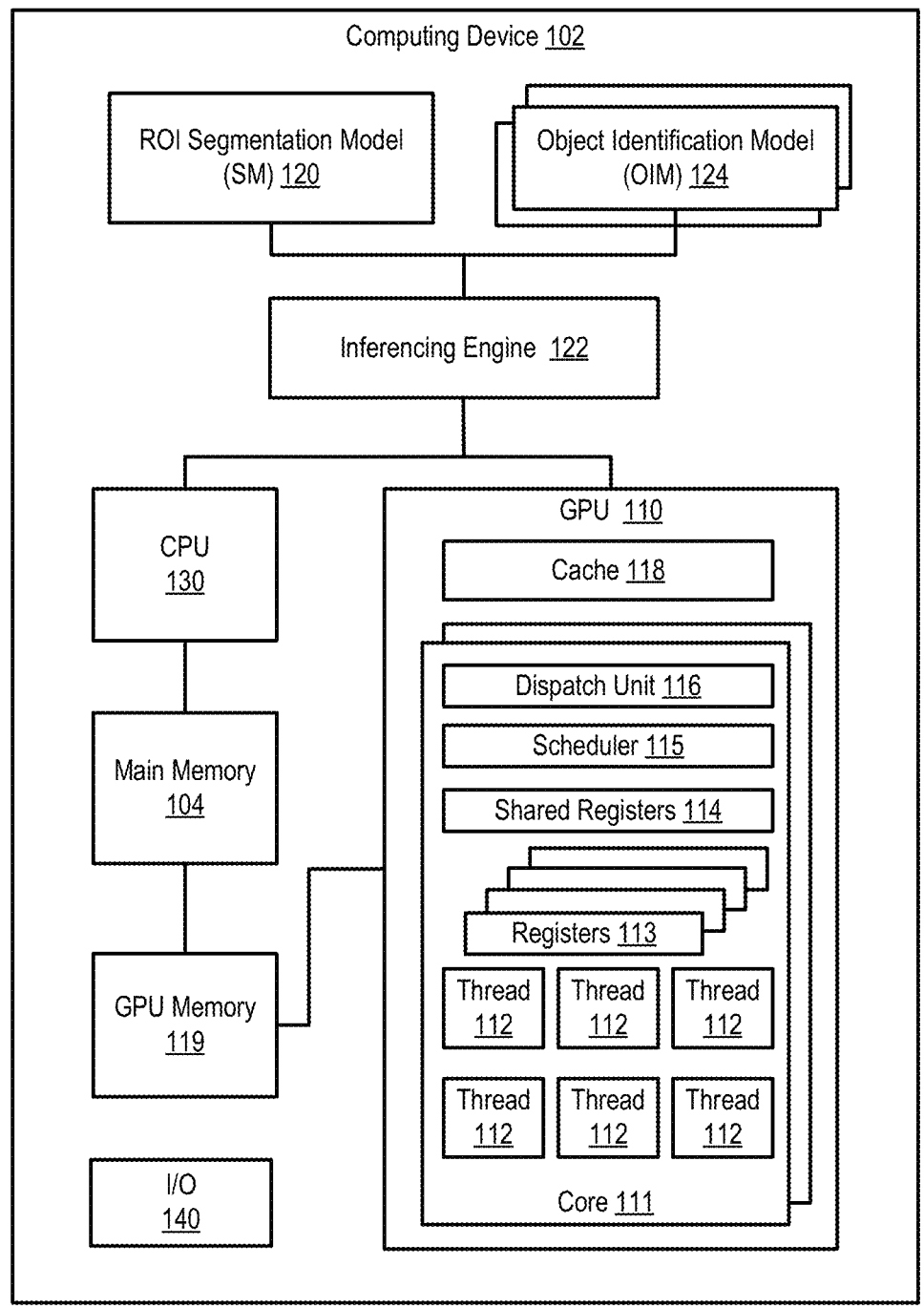
FIG. 1B is an example computing device which may implement machine learning for image segmentation into regions of interest and efficient object identification, according to at least one embodiment.

FIG. 1B is an example computing device 102 which may implement machine learning for image segmentation into regions of interest and efficient object identification, according to at least one embodiment. In at least one embodiment, Inferencing engine 122 may be executed by one or more GPUs 110 and may use SM 120 and one or more OIMs 124 to perform segmentation into regions of interest and efficient object identification. In at least one embodiment, a GPU 110 includes multiple cores 111, each core being capable of executing multiple threads 112. Each core may run multiple threads 112 concurrently (e.g., in parallel). In at least one embodiment, threads 112 may have access to registers 113. Registers 113 may be thread-specific registers with access to a register restricted to a respective thread. Additionally, shared registers 114 may be accessed by all threads of the core. In at least one embodiment, each core 111 may include a scheduler 115 to distribute computational tasks and processes among different threads 112 of core 111. A dispatch unit 116 may implement scheduled tasks on appropriate threads using correct private registers 113 and shared registers 114. Computing device 102 may include input/output component(s) 134 to facilitate exchange of information with one or more users or developers.

In at least one embodiment, GPU 110 may have a (high-speed) cache 118, access to which may be shared by multiple cores 111. Furthermore, computing device 102 may include a GPU memory 119 where GPU 110 may store intermediate and/or final results (outputs) of various computations performed by GPU 110. After completion of a particular task, GPU 110 (or CPU 130) may move the output to (main) memory 104. In at least one embodiment, CPU 130 may execute processes that involve serial computational tasks (assigned by Inferencing engine 122) whereas GPU 110 may execute tasks (such as multiplication of inputs of a neural node by weights and adding biases) that are amenable to parallel processing. In at least one embodiment, Inferencing engine 122 may determine which processes are to be executed on GPU 110 and which processes are to be executed on CPU 130. In other embodiments, CPU 130 may determine which processes are to be executed on GPU 110 and which processes are to be executed on CPU 130.

Figure 2:
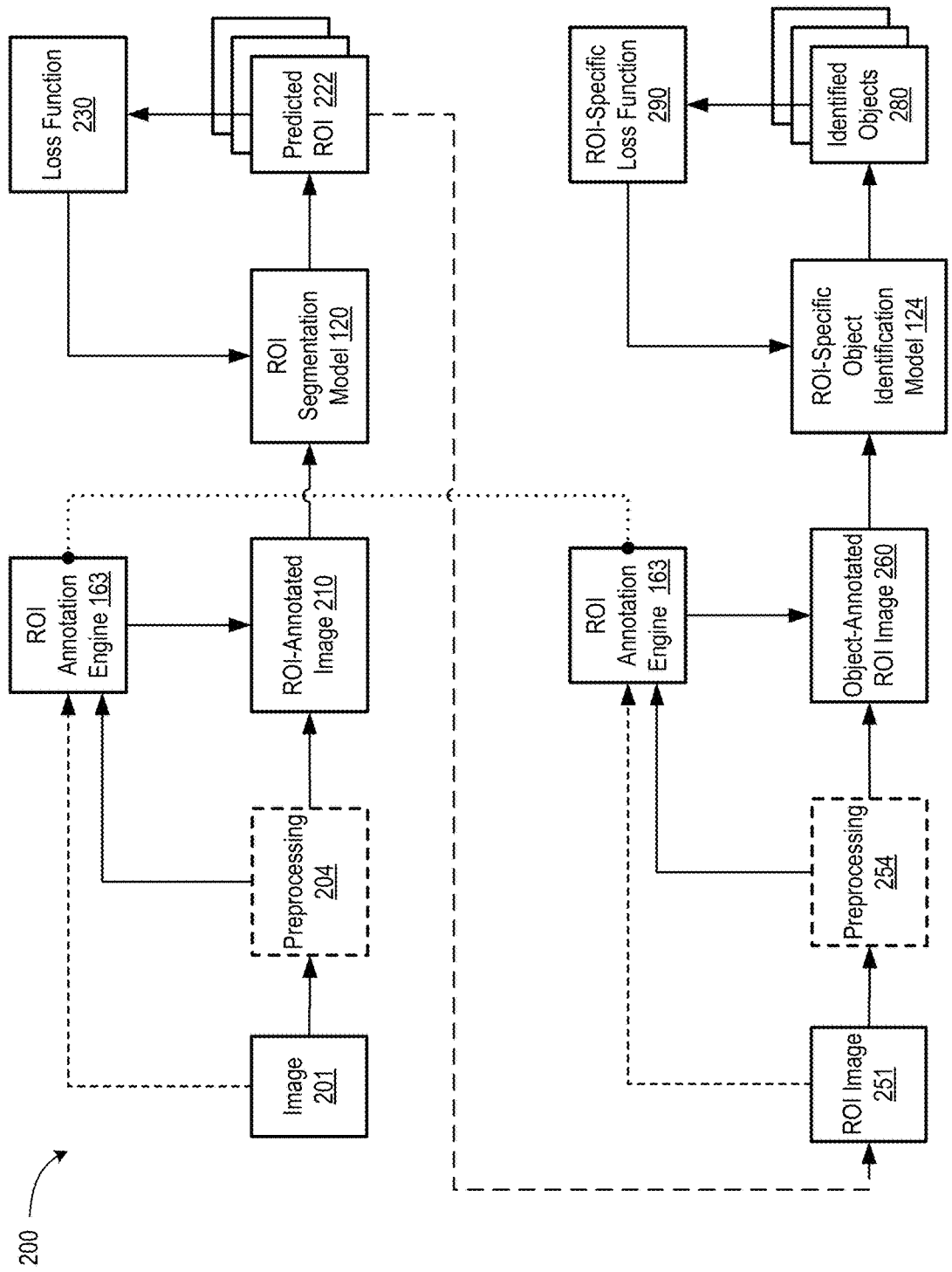
FIG. 2 illustrates an example data flow during training of machine learning models that may be used for image segmentation into regions of interest and efficient object identification, according to at least one embodiment.

FIG. 2 illustrates an example data flow 200 during training of machine learning models that may be used for image segmentation into regions of interest and efficient object identification, according to at least one embodiment. In at least one embodiment, data flow 200 may be implemented by Inferencing engine 122 of computing device 102 of FIGS. 1A and 1B. As depicted in FIG. 2, an image 201 (e.g., a raw medical image) may undergo a number of operations. In at least one embodiment, image 201 may be a three-dimensional image represented as intensity data I(x, y, z) that provides an intensity value I for a plurality of voxels identified with coordinates x, y, z. Alternatively, any other identification scheme may be used to identify voxels of the image (e.g., spherical coordinates, cylindrical coordinates, and so on). Intensity value I may represent a degree of interaction of the matter being imaged (e.g., human organs and tissues, objects in an automotive environment, etc.) with the imaging medium (e.g., x-rays of a CT scan apparatus, magnetic field of an MRI apparatus, laser beam of a LiDAR device, and the like). For example, intensity value I can represent absorption of x-rays by biological tissues. Intensity may be measured in any appropriate units, e.g., in the limited range extending from 0 to 1 (0 to 100, or in any other limited range), with I=0 corresponding to complete absorption of x-rays and I=0 corresponding to free passage of x-rays (or vice versa). Alternatively, any other units may be used, e.g., unbounded units, such as Hounsfield units that relate x-ray absorption to that of water (and air). In at least one embodiment, an image may be a two-dimensional image with the intensity data I(x, y) specifying the intensity value for a plurality of pixels identified with two-dimensional coordinates x, y. In at least one embodiment, the intensity data may include multiple intensity values, $\{I_j(x, y)\}$ (or $\{I_j(x, y, z)\}$) for various pixels (or voxels) of image 201, e.g., multiple intensity values corresponding to RGB (red, green, blue) colors or CMYK (cyan, magenta, yellow, black) colors, and so on. In at least one embodiment, multiple intensity values may be obtained for different instances of time. For example, a patient may be imaged multiple times over a period of a tumor evolution (e.g., months or years). Similarly, multiple time-series data may be taken during a single imaging session. In at least one embodiment, pixels (or voxels) of image 201 may have multiple intensity values obtained with different imaging techniques. For example, intensity value $I_1(x, y, z)$ may represent results of a lidar imaging of an autonomous vehicle environment whereas intensity value $I_2(x, y, z)$ may represent results of camera imaging of the same environment.

In at least one embodiment, image 201 may undergo preprocessing 204, which may include trimming, image sharpening, blur, noise or other artifact removal, compression, resampling, normalizing, upsampling, or other operations, or any combination thereof. Image 201 may be input into ROI annotation engine 163 (which may often happen after preprocessing 204 but in some instances may also happen before preprocessing 204) for annotating ROIs within image 201. In at least one embodiment, ROI annotation engine 163 may be a computing module that implements ROI annotations applied by a human developer. For example, a human developer may identify (e.g., on a screen accessible to ROI annotation engine 163) various ROIs within image 201 using reference points, bounding boxes, numerals, coordinates of bounding planes, border lines, and other geometric or numerical markers to produce a ROI-annotated image 210. In at least one embodiment, ROI annotation engine 163 may generate ROI-annotated image 210 with reduced input from the human developer. For example, ROI annotation engine 163 may perform crude identification of ROI candidates (e.g., based on known anatomical locations of various organs within the body of a patient) and provide identified ROI candidates to the developer for confirmation or final adjustments. In at least one embodiment, ROI annotation engine 163 may generate ROI-annotated image 210 without any input from the developer. For example, annotations of image 201 with indications of ROIs may be generated by a different model, which may use mathematical formulas, decision trees, support vector machines, or some other algorithms.

In at least one embodiment, ROI-annotated image 210 may correspond to image 201 (e.g., no voxels or pixels may be modified or added within image 201) with an additional annotation metadata provided by ROI annotation engine 163 and associated with image 201. Accordingly, during training of ROI segmentation model 120, un-annotated image 201 may be used as a training input 165 whereas annotation metadata may be used as mapping data 166 that associates training input 165 to a correct target output 167. In at least one embodiment, ROI-annotated image 210 (including image 201 and annotation metadata) may be input into ROI segmentation model (SM) 120. The input into SM 120 may be a digital representation of the intensity map I(x, y, z) of image 201. SM 120 may process the input intensity map and output a prediction identifying ROIs within image 201. Predicted ROI 222 may then be compared with target ROIs (e.g., identified in annotation metadata of ROI-annotated image 210) using a loss function 230. Multiple predicted ROIs 222 may be output by SM 120, for each of the target ROIs. A predicted ROI 222 may be specified via a digital representation of the location of the respective predicted ROI 222, such as coordinates of eight vertices of a parallelepiped (bounding box) that encloses the respective ROI. In at least one embodiment, a different digital representation may be used, such as the representation that specifies a center of a bounding sphere of a determined radius (four parameters), a center of an ellipsoid with three specified semi-axes (six parameters), or any other geometric figure. In at least one embodiment, different digital representations may be used for different ROIs (organs). For example, an ellipsoid bounding box/shape may be specified for a kidney ROI while a parallelepiped bounding box/shape may be specified for a liver ROI.

Loss function 230 may compare representations of predicted ROIs with annotation metadata. Loss function 230 may be a binary cross-entropy loss function, mean squared error loss functions, mean squared error loss functions, weighted mean square error loss functions, mean absolute error loss functions, Huber loss functions, Hinge loss functions, multi-class cross entropy loss functions, Kullback-Liebler loss functions, and the like. In at least one embodiment, loss function 230 may compare locations of the bounding box of predicted ROI 222 to the locations of the bounding box identified by the annotation metadata and determine a value (a loss value or cost value) that describes how accurately SM 120 has identified the location of predicted ROI 222. In at least one embodiment, more than one loss function 230 may be deployed. Some of the deployed loss functions 230 may be ROI-specific loss functions and may weigh errors differently for different target ROIs. For example, loss function 230 for a larger organ (such as the lungs) may be more tolerant to errors in the predictions of the respective bounding box whereas loss function 230 for a smaller organ (such as the gallbladder) may be less tolerant to such errors. In at least one embodiment, loss function 230 may output a single loss value for the entire bounding box. In at least one embodiment, loss function 230 may output multiple loss values, such as a separate loss value for various parameters of the bounding box, e.g., a separate loss value for each vertex of the bounding box.

In at least one embodiment, training engine 162 may adjust parameters of SM 120 to minimize the loss value(s) determined by loss function(s) 230. For example, in embodiments where SM 120 includes one or more neural networks, the loss value(s) may be back-propagated through various layers of the neural networks and parameters of the neural networks (biases, weights, etc.) may be adjusted (by training engine 162) until observed differences (loss values) between locations of predicted ROI(s) 222 and target locations specified in annotation metadata are minimized. Subsequently, SM 120 may be trained with additional images 201 until SM 120 is capable of successfully identifying ROIs in new images with a target accuracy, e.g., until ROIs within a set of testing images are misidentified in fewer than a certain percentage of cases.

ROIs segmented from image 201 may be used to train ROI-specific OIMs 124 to identify various objects of interest within each ROI. As further depicted in FIG. 2, ROI data 251 may include predicted ROI 222, and may additionally include various metadata, such as metadata related to a type of machine or device that generated initial image 201, information about patients (e.g., age, sex, history of past surgeries, and the like). In at least one embodiment, ROI image 251 may include identification(s) of the bounding box(es) output by SM 120 in addition to the identification of the (large) image 201 (e.g., location of image 201 in the memory 104 or image repository 150). In at least one embodiment, ROI image 251 may be an actual sub-image of image 201, e.g., a segmented and saved (to memory) region of image 201. An identification scheme for voxels (or pixels) of ROI image 251 may be the same or similar to the scheme used to identify voxels (or pixels) of image 201.

In at least one embodiment, ROI image 251 may undergo additional preprocessing 254, which may include any of preprocessing techniques and methods referenced in relation to preprocessing 204, but tailored to the type of ROI being processed. ROI image 251 may be input into ROI annotation engine 163 (before or after preprocessing 254). In at least one embodiment, ROI annotation engine 163 may perform object annotation similar to how ROI annotation engine 163 generates ROI-annotated image 210. For example, ROI annotation engine 163 (with or without a developer input) may identify various objects within ROI image 251 using reference points, bounding boxes, numerals, coordinates of bounding planes, lines, and other geometric or numerical markers to generate object-annotated ROI image 260.

In at least one embodiment, object-annotated ROI image 260 may correspond to ROI image 251 (e.g., no voxels or pixels are added to or modified within ROI image 251) with an additional object-annotation metadata provided by ROI annotation engine 163 and associated with ROI image 251. Accordingly, during training of ROI-specific OIM 124, un-annotated ROI image 251 may be used as a training input whereas object-annotation metadata may be used to identify correct target output. In at least one embodiment, object-annotated ROI image 260 (including image 251 and object-annotation metadata) may be input into ROI-specific OIM 124. In at least one embodiment, the number of OIMs 124 that are used during the inference stage may be at least the number of different types of ROIs within image 201. The input into OIM 124 may be a digital representation of the intensity map I(x, y, z) of ROI image 251. OIM 124 may process the input intensity map and output a prediction for identified objects 280 within ROI image 251. Identified objects 280 may be compared with object-annotation metadata of object-annotated ROI image 251 using a ROI-specific loss function 290. Multiple identified objects 280 may be output by OIM 124. An identified object 280 may be specified via a digital representation of the location of the respective bounding box or using any other identifiers, such as coordinates of eight vertices of a parallelepiped bounding box that encloses the respective identified object 280. In at least one embodiment, a bounding sphere, ellipsoid, or any other geometric figure may be used. In at least one embodiment, different digital representations may be used for different identified objects 280 within a single ROI. For example, an ellipsoid bounding box/shape may be specified for a gallbladder obstruction, while a parallelepiped bounding box/shape may be used to indicate a gallstone.

ROI-specific loss function 290 may compare representations of identified objects with object-annotation metadata generated by ROI annotation engine. In some implementations, ROI-specific loss function 290 may be any one of the loss functions listed in reference to loss function 230 above. In at least one embodiment, ROI-specific loss function 290 may be the same as loss function 230. In at least one embodiment, ROI-specific loss function 290 may be different from loss function 230 and further may be different for different ROI-specific OIM 124. ROI-specific loss function 290 may compare locations of the bounding box(es) of identified object(s) 280 to the locations of the bounding box identified by the object-annotation metadata to determine a value (a loss value or cost value) that describes how accurately OIM 124 has determined the location of identified objects 280.

In at least one embodiment, training engine 162 may adjust parameters of OIM 124 to minimize the loss value(s) determined by ROI-specific loss function(s) 290. For example, in embodiments where OIM 124 includes one or more neural networks, the loss value(s) may be back-propagated through various layers of the neural networks and parameters of the neural networks (biases, weights, etc.) may be adjusted (by training engine 162) until observed differences (loss values) between locations of identified objects 280 and target object locations specified in object-annotation metadata are minimized. Subsequently, OIM 124 may be trained with additional ROI images 251 until OIM 124 is capable of successfully identifying objects in new ROI images 251 with a target accuracy, e.g., until objects within a set of testing ROI images 251 are misidentified in fewer than a certain percentage of cases.

Figure 3:
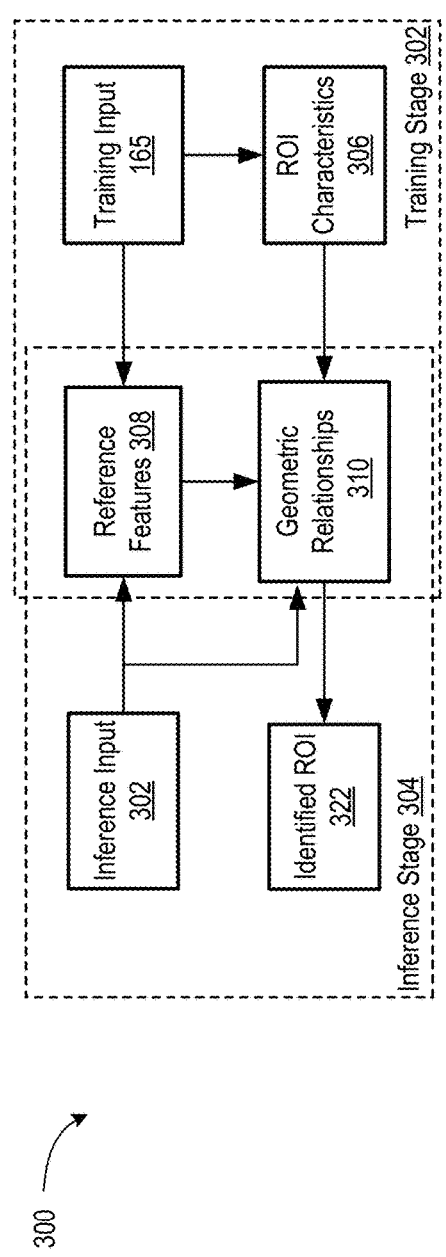
FIG. 3 illustrates example operations performed during identification of regions of interest using a machine learning model, according to at least one embodiment.
Figure 3:
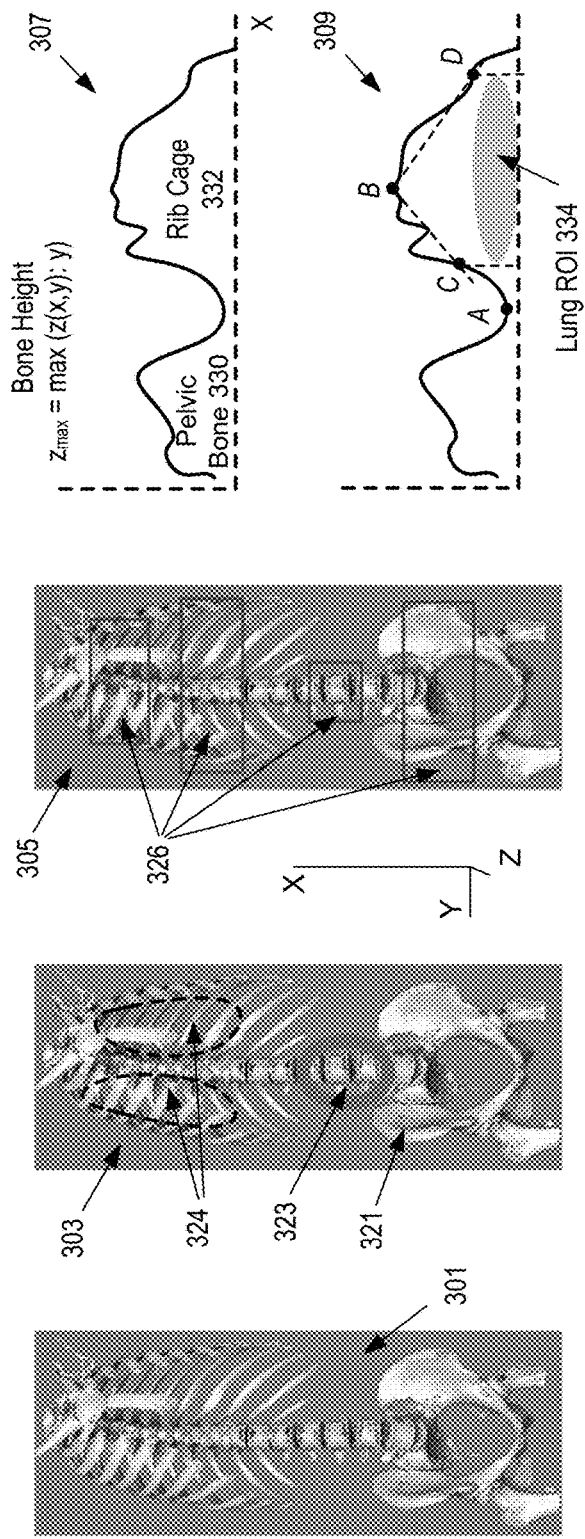

FIG. 3 illustrates example operations 300 performed during identification of regions of interest using a machine learning model, according to at least one embodiment. Shown are example operations of a training stage 302 and inference stage 304. Operations 300 are illustrated using a non-limiting example of a processing of a three-dimensional medical image 301, but any other type of image may be processed using a similar sequence of operations. Other images may be processed in the context of automotive, marine, aeronautical, military, security, robotics, industrial, geological, or any other applications. In at least one embodiment, image 301 may be a training image (and a part of a training input 165). Training input 165 may further include ROI annotation metadata (e.g., as provided by ROI annotation engine 163) indicating locations of various ROIs within image 301. Training input 165 may further include other metadata that describes a type of image 301 (e.g., CT or MRI), settings of an apparatus that generated image 301 (e.g., exposition, signal intensity, programming sequence, etc.), patient information (e.g., medical history, biographical information, etc.), and other types of information. During inference stage 304, image 301 may be a new image (not previously encountered during training stage 302) and may be a part of inference input 302. Inference input 302 may further include some types of metadata that is also included in training input(s) 165 (e.g., medical imaging device and diagnostic technique identifications) but may exclude other types of metadata (e.g., ROI annotation metadata).

During training stage 302, ROI-annotated images 301 may be processed by a machine learning model, e.g., ROI Segmentation Model 120, to identify ROI characteristics 306 of various ROIs that SM 120 is being trained to identify as well as to identify reference features 308 that are present in image 301. ROI characteristics 306 may be determined based on analysis of one or more intensity data I(x, y, z) of image 301. For example, ROI characteristics 306 may include a size of the respective (annotated) ROI, e.g., determined as the total number of voxels (or pixels) of the ROI with intensity values above (or below) a certain intensity threshold $I(x, y, z) > I_0$ (or $I(x, y, z) < I_0$). ROI characteristics 306 may further include a location of the respective ROI, e.g., the coordinates of the bounding box that encloses a region of voxels (or pixels) of the ROI whose intensity value is above (or below) the intensity threshold $I(x, y, z) > I_0$ (or $I(x, y, z) < I_0$). ROI characteristics 306 may further include a description of the respective ROI location relative to other ROIs, e.g., a description of neighboring organs located above, below, behind, etc. the respective ROI/organ. ROI characteristics 306 may also include a shape of the respective ROI, such as a representation (e.g., a vector representation) of the boundary of the respective ROI (e.g., a geometrical surface $I(x, y, z) = I_0$) via a number of pre-defined shapes (spheres, ellipsoids, cylinders, planes, and the like). ROI characteristics 306 may additionally include a topology of the respective ROI, such as a number of lobes, interconnected sub-parts of the ROI, the types of connections between the sub-parts, and so on. ROI characteristics 306 may further include an average intensity value across the bounding box or across the region where $I(x, y, z) > I_0$ (or $I(x, y, z) < I_0$), a maximum intensity, a minimum intensity, a degree of uniformity or non-uniformity of intensity (e.g., represented by the variance of the intensity within the ROI). Various other representative parameters may be included in ROI characteristics 306.

During training stage 302, ROI-annotated images 301 may also be processed by SM 120, to identify reference features 308 of image 301. While ROI characteristics 306 may relate to properties of various individual ROIs, reference features 308 may relate to properties of image 301 at larger scale, or to features that are common to the images of the same type as image 301. For example, a medical image of a torso and/or abdomen of a patient may include images of bones (skull, backbone, rib cage, pelvic bones, etc.) that may be distinctly visible and present in most or every image of the same type of a diagnostic procedure and may, therefore, be used as reference features 308 with relation to which various ROI locations may be identified. Organs, such as lungs, may have a rather reproducible (from patient to patient and from image to image) arrangement of bones, including ribs, collarbones, sternum, and the like, even when exact position of the patient is not identical for different images 301. Similarly, an arrangement of vehicles on a roadway may have a reproducible relationship to the surface of the roadway independent of weather, time of day and week, intensity of traffic and so on. For example, an image taken by an autonomous vehicle's camera in the direction of the autonomous vehicle's motion is likely to capture vehicles travelling in the same direction, if such vehicles are positioned between the centerline and the right edge line, and to capture vehicles travelling in the opposite direction, if such vehicles are positioned between the centerline and the left edge line. Similarly, the image is likely to capture vehicles that are parked, if such vehicles are positioned outside the edge lines (or on top of the edge lines), and so on.

During training stage 302, SM 120 may be trained to identify the one or more ROI characteristics 306 that are most representative (and/or most reproducible) among various properties and visual characteristics of various ROIs. Similarly, SM 120 may be trained to identify reference features 308 that are most representative of various features that may be present in a training image, and to identify one or more geometric relationships 310 between various ROI characteristics 306 and reference features 308. Identified geometric relationships 310 may be used to determine locations of ROIs within image 301. For example, shown in image 301(a) is a region 323 of a visible portion of a patient's skeleton 321 where a two-dimensional sectional image (along YZ cross-section) that is perpendicular to the X axis reveals only vertebrae, but no other bones. In contrast, above (e.g., towards increasing coordinate X) the region 323, an YZ sectional image would also capture images of one or more ribs, the sternum, etc., whereas below region 323, a sectional image would capture part(s) of the pelvic bone. Accordingly, region 323 (or a center of region 323) may be used as one of reference features 308.

Based on learned (during training) ROI characteristics 306 of various ROIs (e.g., organs), locations of the ROIs can be determined based on one or more geometric relationships 310 between region 323 (whose dimensions and location are being used as reference features 308) and various ROIs within image 301 (e.g., locations of individual organs of the patient). For example, the diaphragm can be positioned a certain distance $l_1$ above the center of region 323, the lower boundary of the lungs can be positioned a distance $l_2$ above the center of region 323, the top of bladder can be positioned a distance $l_3$ below the center of region 323, and so on. In at least one embodiment, some or all distances $l_1$, $l_2$, and/or $l_3$ may be measured in absolute units of length (e.g., centimeters, inches, etc.). In at least one embodiment, some or all distances $l_1$, $l_2$, and/or $l_3$ may be measured in relative units, e.g., in units of the length (e.g., along the direction X) of the region 323, which may be smaller or larger, depending on a size of the patient. Other reference features 308 may include distinct bone signatures, such as vertebrae, sternum, the widest section of the pelvic bone, and so on.

In at least one embodiment, one or more reference features 308 in image 305 may be identified using one or more intensity map(s) I(x, y, z). For example, SM 120 may select one or more three-dimensional sampling regions 326 and extract (sample) a number of two-dimensional intensity maps $I_i(y, z)$ corresponding to various values of coordinate x that takes discretized values $x = i \times \Delta x$, with i assuming integer values within an interval corresponding to a particular sampling region 326. Alternatively (or additionally), SM 120 may sample, from the three-dimensional map I(x, y, z), a number of two-dimensional sectional maps $I_j(x, y)$ and $I_k(y, z)$ that corresponds to various values of coordinates x and y taking discretized values, e.g., $y = j \times \Delta y$ and $z = k \times \Delta z$, with j and k assuming integer values within a respective interval that corresponds to the particular sampling region 326. SM 120 can determine reference features 308 (e.g., locations, sizes, associated intensities, etc.) based on the analysis of multiple two-dimensional intensity maps $I_i(y, z)$, $I_j(x, y)$, and $I_k(y, z)$. Additionally, in some embodiments, each or some of the two-dimensional intensity maps can be further subdivided (sampled) into a number of one-dimensional intensity maps $I_{ij}(z)$, $I_{jk}(x)$, $I_{ik}(y)$. In some implementations, various intensity maps $I_{ij}(z)$, $I_{jk}(x)$, $I_{ik}(y)$ (and/or $I_i(y,z)$, $I_j(x,y)$, and $I_k(y,z)$) may be input into a neural network (or other machine-learning model) of SM 120 and SM 120 may determine locations, geometry, intensity, etc. of various reference features 308.

In at least one embodiment, selection of sampling regions 326 within image 305 may be performed based on predetermined heuristics. For example, sampling regions 326 may be sufficiently large so that a fixed arrangement of sampling regions 326 relative to input images (e.g., image 305) is likely to capture all or most reference features 308 even when input images are taken of patients of different size, age, sex, or of patients that are placed in somewhat different positions, and so on. In at least one embodiment, selection of sampling regions 326 within image 305 may be performed randomly. In at least one embodiment, combined sampling regions 326 may occupy an entire volume of image 305 or may even overlap with adjacent sampling regions 326.

In one non-limiting example of a magical image, SM 120 may analyze multiple two-dimensional intensity maps $I_i(y, z)$ and identify, within each map, pixels corresponding to the bone structure. For example, the bone structure may be associated with those pixels whose intensity values are greater than a certain minimum value $I_{bone}$ (or, depending on the imaging technique being used, are less than a certain maximum value $I_{bone}$). More specifically, SM 120 may identify a bone structure visible within each intensity map $I_i(y, z)$ from equation $I_i(y,z)=I_{bone}$ that determines a boundary of the bone region $z_i(y)$ within the i-th section perpendicular to the x axis. SM 120 may also identify the maximum height (along the z axis) of the determined boundary $z_{max}(i)=\max(z_i(y):y)$. Plot 307 illustrates (not to scale) such a maximum height $z_{max}(i)$ for various distances $x=i\times\Delta x$ (for simplicity, plot 307 depicts a continuous maximum height $z_{max}(x)$ curve even though, in specific embodiments, a discretized version $z_{max}(i)$ may be used). SM 120 may then identify a lung ROI based on the form of the curve $z_{max}(i)$. For example, SM 120 may identify two major features of the function $z_{max}(i)$ that correspond to the pelvic bone 330 and the rib cage 332. SM 120 may further identify a number of points (reference points or control points) of the curve $z_{max}(i)$. For example, point A may correspond to a minimum height of $z_{max}(i)$ and may be identified with region 323 where no other bones except for the vertebrae of the spine are located. SM 120 may further identify point B which is a top point of the rib cage. Points A and B may be some of reference features 308. SM 120 may also determine a location of the lung ROI 334 based on geometric relationship(s) of the lung ROI 334 with points A and B. In at least one embodiment, SM 120 may identify a point C where the height of the rib cage 332 drops, from the maximum height at B, by some factor a (e.g., by a=2, 2.5 . . . , or by any other value determined during training of SM 120). SM 120 may further identify a point D where the height of the rib cage 332 decreases by some factor b (e.g., b=2.5, 3 . . . , or by any other value determined during training). In another embodiment, the location of the bottom of the lung ROI 334 may be predicted as being at a certain distance (determined during training state 302) from point A. The x coordinates of points C and D may represent the locations (within the x axis) of the lung ROI 334. Location of the lung ROI 334 (or any other ROI) along the other two axes (or one axis, if image 305 is two-dimensional) may be determined in a similar manner.

During inference stage 304, using a new input image as part of reference input 302, trained SM 120 may perform similar analysis and similar computations based on identified, within the new image, one or more reference features 308 (e.g., some or all of the points A, B, C, and/or D, etc.). Using the identified reference features 308 and one or more geometric relationships 310, trained SM 120 may identify one or more ROI 322. The reference features and geometric relationships described in relation to operations 300 are intended as an example. There are practically unlimited number of reference features and geometric relationships of such features to ROIs that may be identified in various contexts where aspects and implementations of the present disclosure may be used.

Although operations 300 are illustrated in FIG. 3 in the context of identification of ROIs by the segmentation model 120, similar operations may be performed during training and inference phases with respect to different OIMs 124 that identify various objects within ROIs 122. For example, during training stage of one or more OIMs 124, object characteristics of various target objects within a ROI may be identified. For example, such object characteristics may include a number of lobes of an organ (e.g., three lobes of the right lung, two lobes of the left lung, etc.), a typical size, shape of an object, its relative orientation to other objects, and so on. For each ROI, one or more reference features may be identified by the respective OIM 124, such as a heart muscle separating the left ventricle from the right ventricle, and one or more geometric relationships may be determined between the identified object characteristics and reference features of the object. Based on such geometric relationships, the respective OIM 124 identifies various target objects within each (or some of) ROI(s), e.g., using three- and two-dimensional intensity maps, similar to how various ROIs can be determined, e.g., as described above in relation to FIG. 3. In at least one embodiment, additional MLMs can be trained to identify sub-objects within objects (and, similarly, sub-sub-objects within sub-objects, and so on) by performing further segmentation of objects into target sub-objects using geometric relationships between respective reference features and sub-object characteristics. Multiple levels (e.g., sub-sub-objects, and so on etc.) of the object hierarchy may be defined and processed in a similar way).

Figure 4:
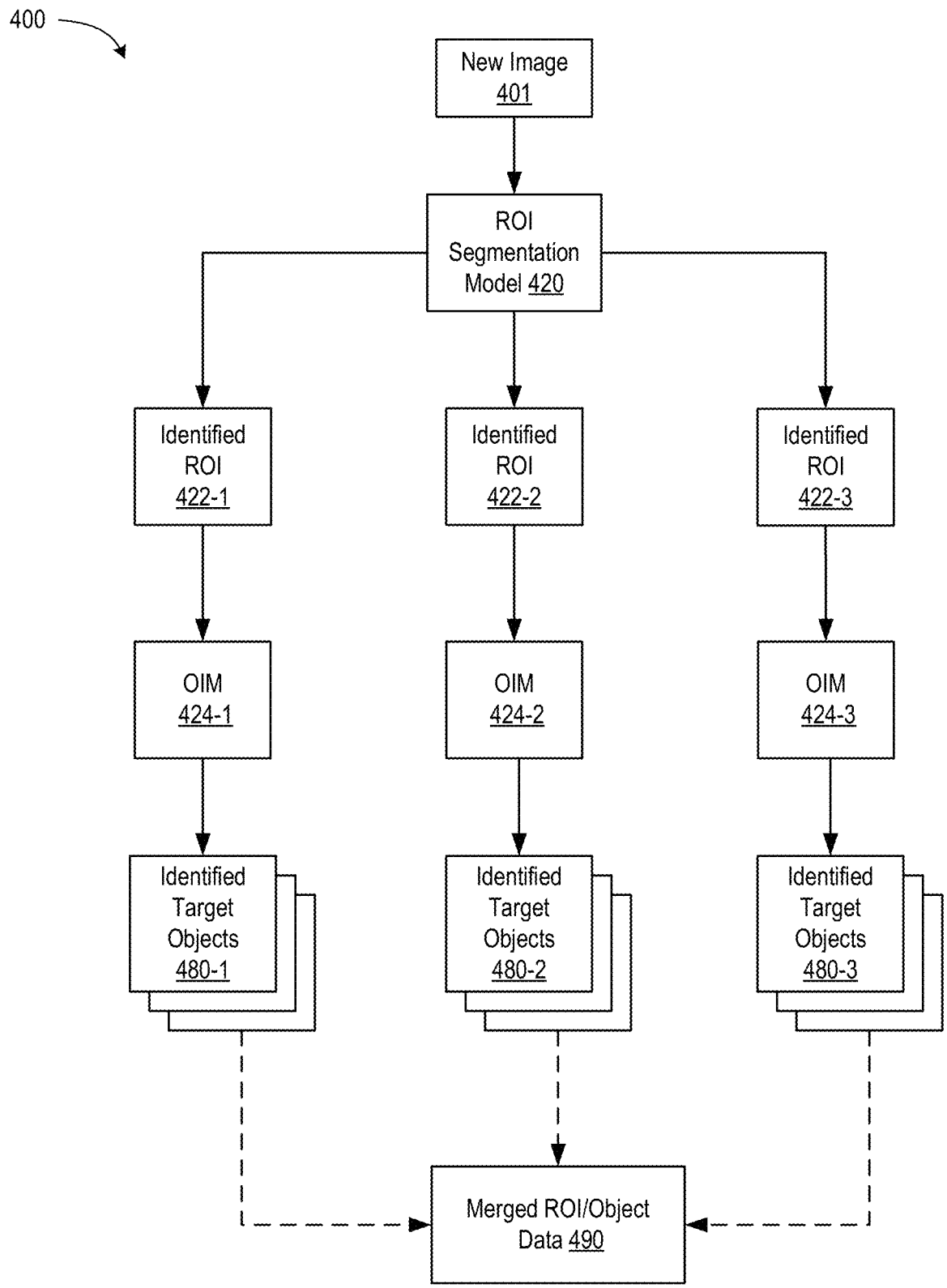
FIG. 4 illustrates an example data flow during inference stage of operation of machine learning models that can be used for image segmentation into regions of interest and efficient object identification, according to at least one embodiment.

FIG. 4 illustrates an example data flow 400 during inference stage of operation of machine learning models that can be used for image segmentation into regions of interest and efficient object identification, according to at least one embodiment. Various modules and objects depicted in FIG. 4 and denoted with numerals that differ by the first digit from numerals used in FIGS. 1-3 may refer to the same modules and objects as depicted in respective figures; for example, ROI segmentation model 420 may be the same (or similar) model as SM 120 of FIGS. 2-3. As shown in FIG. 4, a new image 401 may be input into ROI segmentation model 420, which may identify one or more ROIs 422 (e.g., 422-1, 422-2, 422-3, etc.). Each of some of the identified ROIs 422 may be input into a respective one of object identification models 424 to identify one or more target objects 480 (e.g., 480-1, 480-2, 480-3, etc.). The identified target objects can be combined into a merged ROI(s)/object data 490 and provided to a user (e.g., a health professional).

Figure 5:
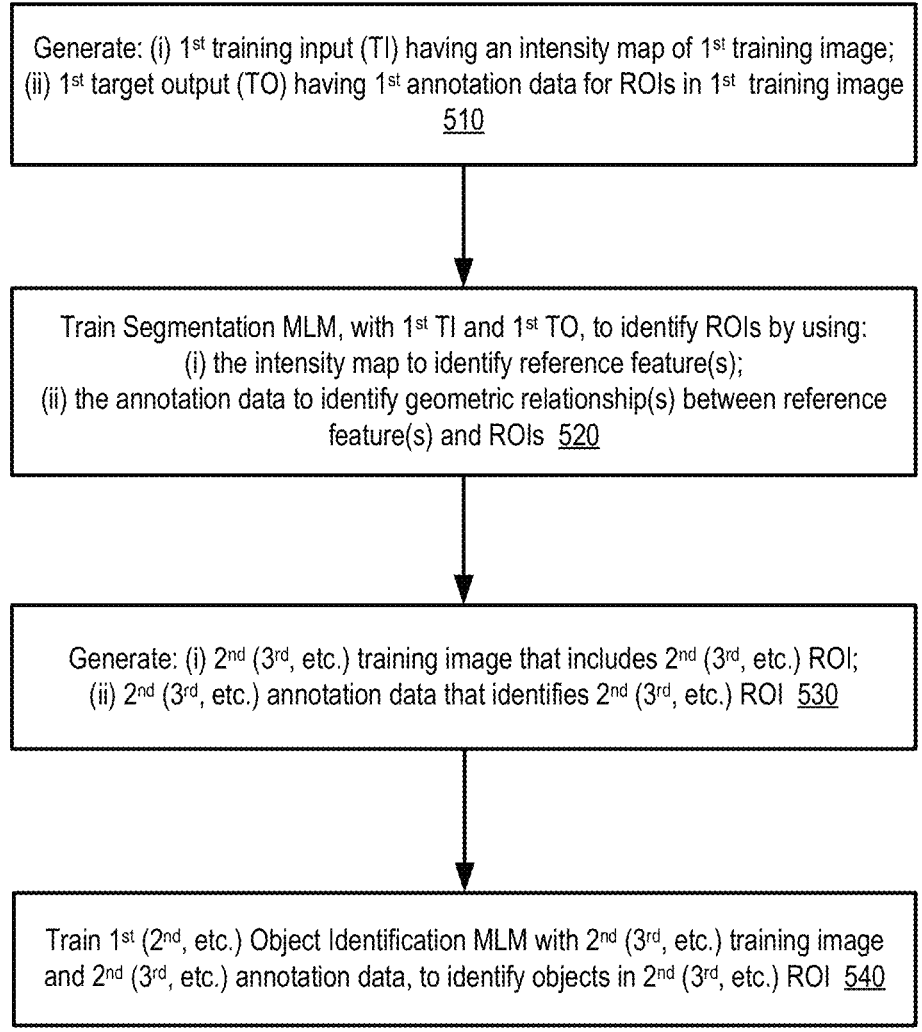
FIG. 5 is a flow diagram of an example method of training machine learning models for use in image segmentation into regions of interest and efficient object identification, according to at least one embodiment.
Figure 6:
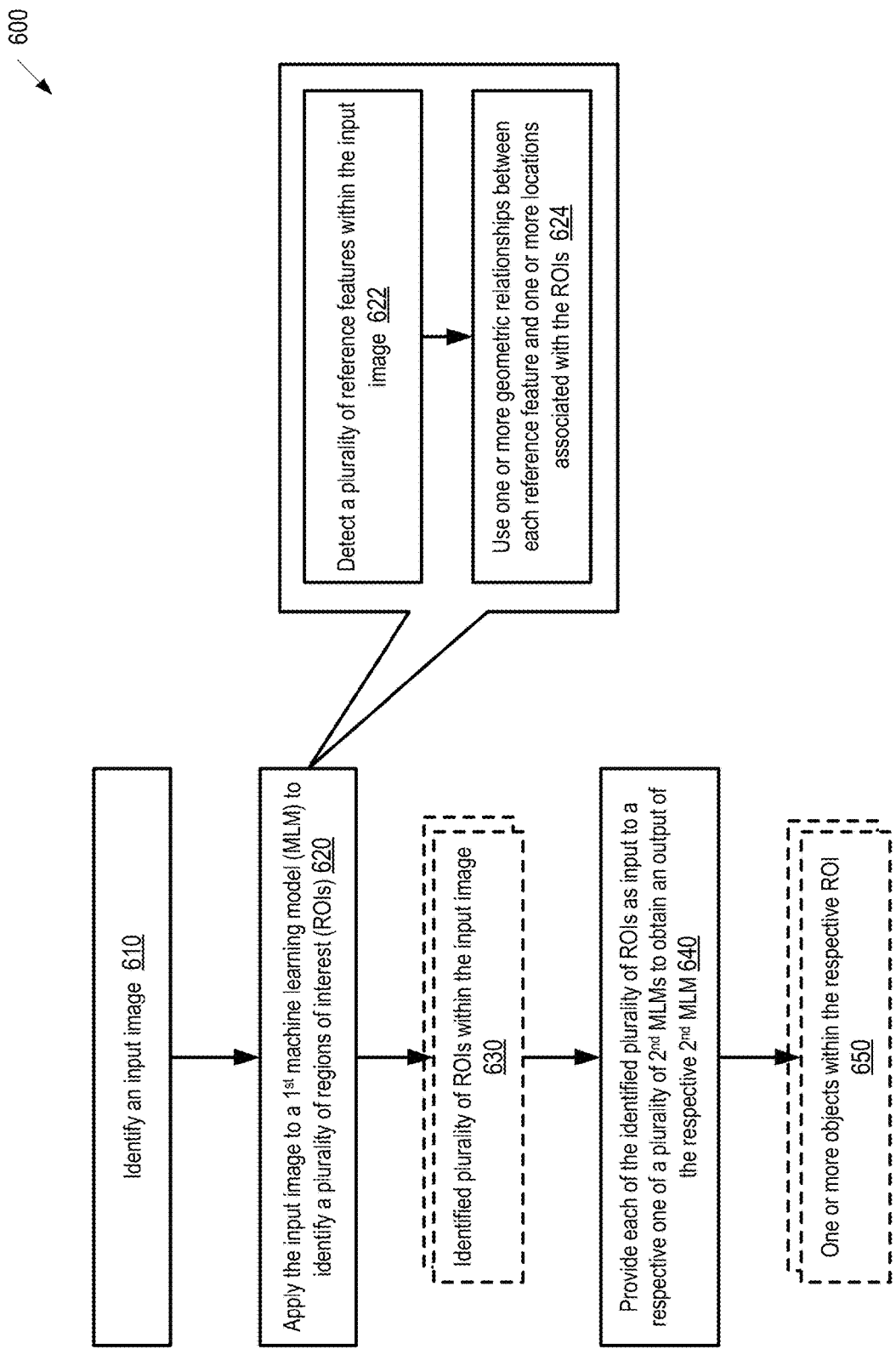
FIG. 6 is a flow diagram of an example method of using a trained machine learning model for image segmentation into regions of interest and efficient object identification, according to at least one embodiment.

FIG. 5 and FIG. 6 are flow diagrams of example methods 500 and 600 respectively that facilitate object identification in images, according to some embodiments of the present disclosure. In at least one embodiment, method 500 and method 600 may be performed by processing units of training server 160 or computing device 102. Methods 500 and 600 may be performed by one or more processing units (e.g., CPUs and/or GPUs), which may include (or communicate with) one or more memory devices. In at least one embodiment, method 500 and method 600 may be performed by multiple processing threads (e.g., CPU threads and/or GPU threads), each thread executing one or more individual functions, routines, subroutines, or operations of the method. In at least one embodiment, processing threads implementing method 500 (and, similarly, method 600) may be synchronized (e.g., using semaphores, critical sections, and/or other thread synchronization mechanisms). Alternatively, processing threads implementing method 500 (and, similarly, method 600) may be executed asynchronously with respect to each other. Various operations of methods 500 and 600 may be performed in a different order compared with the order shown in FIGS. 5 and 6. Some operations of the methods may be performed concurrently with other operations. In at least one embodiment, one or more operations shown in FIGS. 5 and 6 may not always be performed.

FIG. 5 is a flow diagram of an example method 500 of training machine learning models for use in image segmentation into regions of interest and efficient object identification, according to at least one embodiment. Method 500 may be performed to train MLMs for use in medical imaging, autonomous driving systems, industrial settings, and many other contexts. Processing units performing method 500 may generate, at block 510, a first training data that may include a first training input and a first target output. The first training input may include an intensity map of a first training image. The first target output may include first annotation data that identifies a plurality of ROIs in the first training image. The first training image may be a medical image, an image of a driving environment, an image of a shipping facility, an image of a group of people, or any other image suitable for object recognition. The first training input may be one of a first set of training inputs. Similarly, the first target output may be one of a first set of target outputs. At block 520, method 500 may continue with the processing units providing the first training data to train a segmentation MLM. The segmentation MLM may use the intensity map to identify a plurality of reference features within the first training image. The segmentation MLM may further use the annotation data to identify one or more geometric relationships between each reference feature and one or more respective ROIs of the plurality of ROIs.

In at least one embodiment, during training, the segmentation MLM may make a selection of a plurality of reference features within the training image. The selection may be made using a human (e.g., developer's) input. In at least one embodiment, the selection may be made without any human input. The selected reference features may be features that are likely to be present in many images of a similar type. For example, a paved surface of a roadway, an intersection of two or more roadways, lane markings, and so on, may be selected as reference features. In some medical images, the selected plurality of reference features may be associated with an appearance, within the target image, of bones of the patient.

In at least one embodiment, processing units performing method 500 may identify one or more geometric relationships between each selected reference feature and one or more ROI locations associated with a respective ROI type of a plurality of ROI types. For example, in a medical image, identified geometric relationships may be between certain reference ribs and a location of the lungs, and between (the same or other) reference ribs and a location of the liver. The segmentation MLM may identify the plurality of ROIs in the training image. Identification of the ROIs may be based, at least in part, on the one or more identified geometric relationships between each reference feature of the selected plurality of reference features. For example, the segmentation MLM may indicate a location of the lungs based on the geometric relationships of the lungs to the reference ribs, and may similarly indicate a location of the liver.

In at least one embodiment, processing units performing method 500 may determine a mismatch between the identified plurality of ROIs and a target plurality of ROIs for the training image. For example, target locations of the lungs and/or liver (e.g., specified in the annotation metadata for the training image) may not be completely accurate, e.g., may have an error (mismatch) in excess of a maximum tolerance error. Responsive to determining that the maximum tolerance error is exceeded, processing units performing method 500 may update, based on the identified mismatch, the one or more identified geometric relationships. For example, the segmentation MLM may update the geometric relationships (e.g., in the direction of decreasing or increasing the distance) between the reference ribs and the locations of the lungs and/or the liver. In at least one embodiment, the geometric relationship may be updated in arbitrary (multiple) direction(s) and the updated geometric relationship may be back-propagated through the MLM for the same training image. Based on the results of (one or more of such) back-propagation(s), a derivative (or a gradient) of the loss function may be computed and a direction of the most favorable update may be selected. This process may be repeated until the mismatch with the target ROI locations is minimized.

In at least one embodiment, the segmentation MLM may also update the selection of the plurality of reference features. For example, instead of (or in addition to) updating the geometric relationships between reference ribs and ROI locations, the segmentation MLM may transition to using the sternum as a new (updated) reference feature. Similarly, other bones or organs of the patient may be used by the segmentation MLM as reference features. This process may also be repeated until the mismatch of reference features with the target ROI locations is minimized. In at least one embodiment, updates of the geometrical relationships and updates of the reference features may be performed separately (e.g., sequentially). In at least one embodiment, updates of the geometrical relationships and updates of the reference features may be performed concurrently (e.g., in parallel).

At block 530, processing units performing method 500 may generate second (third, etc.) training data comprising a second (third, etc.) training input and a second (third, etc.) target output. The second (third, etc.) training input may include a second (third, etc.) training image (ROI image) representing a first (second, etc.) ROI of the plurality of ROIs. The second (third, etc.) training data may further include the second (third, etc.) target output comprising second (third, etc.) annotation data that identifies one or more objects within the first ROI, the first ROI being of a first ROI type of a plurality of ROI types. The second (third, etc.) training input may be one of a second (third, etc.) set of training inputs. Similarly, the second (third, etc.) target output may be one of a second (third, etc.) set of target outputs.

At block 540, processing units performing method 500 may provide the second (third, etc.) training data to train a first (second, etc.) object identification MLM. After training that is based on the second (third, etc.) set of training inputs and the second (third, etc.) set of target outputs, the first (second, etc.) object identification MLM may be able to identify objects in images of the first (second, etc.) ROI type.

FIG. 6 is a flow diagram of an example method 600 of using a trained machine learning model for image segmentation into regions of interest and efficient object identification, according to at least one embodiment. Processing units performing method 600 may identify, at block 610, an input image to be provided to a first MLM (e.g., SM 120). The input image may be a new image not previously used for training of the machine learning models. In at least one embodiment, the input image may be a multi-dimensional image of a first dimensionality (e.g., a three-dimensional image). In at least one embodiment, the first MLM may be trained to detect a plurality of reference features based at least in part on processing a plurality of sectional images associated with the multi-dimensional image. Each of the plurality of sectional images may be of a second dimensionality (e.g., be two-dimensional images) representing a section of the input image.

At block 620, method 600 may continue with the processing units applying the first MLM to the input image to identify a plurality of ROIs within the input image. In at least one embodiment, the first MLM may be trained using method 500 (or a similar method). As depicted by the blowout section of FIG. 6, application of the first MLM may include (at block 622) detecting a plurality of reference features within the input image. Application of the first MLM may further include (at block 624) using one or more geometric relationships between each reference feature and one or more locations associated with an ROI type of a plurality of ROI types. In at least one embodiment, the first MLM is trained based on a plurality of training images having reference features of a type common with a type of the reference features within the input image. In at least one embodiment, the first MLM may include a neural network with at least one hidden layer. In at least one embodiment, applying the first MLM to the input image may involve executing one or more computations associated with the first MLM on one or more graphics processing units. In at least one embodiment, the input image is a medical image of a patient and the plurality of reference features are associated with an appearance of bones of the patient.

An output of the first MLM may be an identified plurality (block 630) of ROIs within the input image. In at least one embodiment, a first ROI of the plurality of ROIs may include a representation of a first organ or at least a portion of the first organ of the patient. The first ROI may include a sufficiently accurate representation (e.g., depiction) of the first organ and may exclude representations of any portion of other (e.g., second, third, etc.) organs of the patient. Other organs of the patient may be represented by other ROIs identified by the first MLM. For example, a second ROI of the plurality of ROIs may include a representation of a second organ or at least a portion of the second organ. In at least one embodiment, each of the identified ROIs may be specified by a location of the respective ROI within the input image. In at least one embodiment, each of the ROIs may be identified by an actual image or some other representation of the respective ROI.

At block 640, method 600 may continue with the processing units providing each of the identified plurality of ROIs as input to a respective one of a plurality of second MLMs (e.g., OIMs 124) to obtain an output of the respective second MLM. Each of the plurality of the second MLMs may correspond to one of the plurality of ROI types. The output of each of the second MLMs (block 650) may include indications of one or more objects within an ROI of the corresponding ROI type. In at least one embodiment, providing each of the plurality of ROIs to the respective one of the plurality of second MLMs may include providing at least one of a location of the respective ROI within the input image or a representation of the respective ROI (e.g., a part of the input image that includes the ROI).

Inference and Training Logic

Figure 7A:
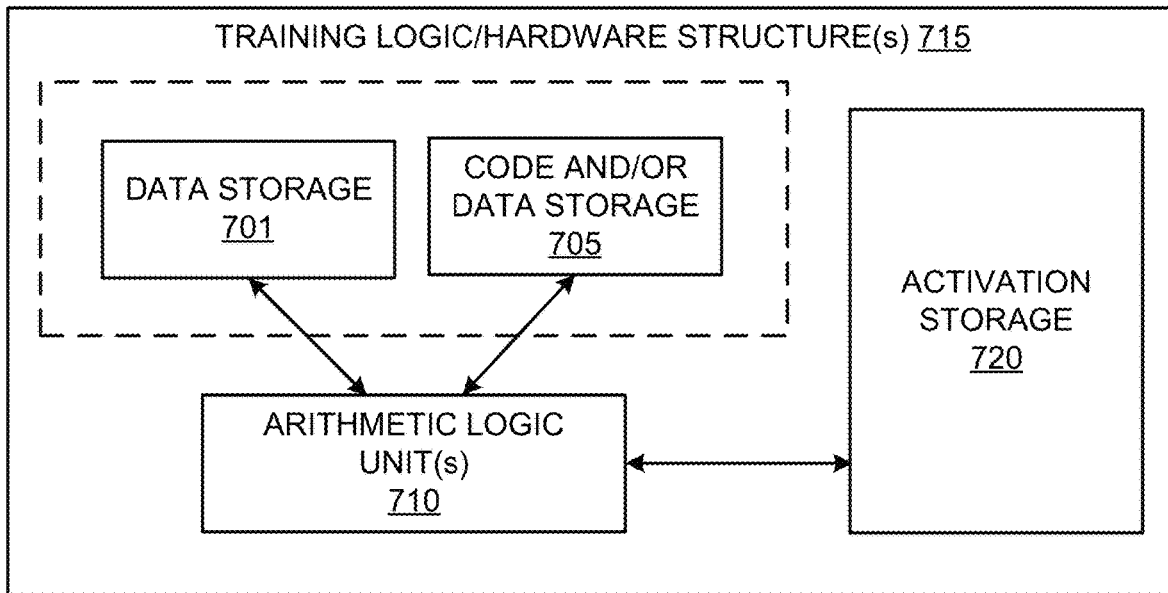
FIG. 7A illustrates inference and/or training logic, according to at least one embodiment.

FIG. 7A illustrates inference and/or training logic 715 used to perform inferencing and/or training operations associated with one or more embodiments.

In at least one embodiment, inference and/or training logic 715 may include, without limitation, code and/or data storage 701 to store forward and/or output weight and/or input/output data, and/or other parameters to configure neurons or layers of a neural network trained and/or used for inferencing in aspects of one or more embodiments. In at least one embodiment, training logic 715 may include, or be coupled to code and/or data storage 701 to store graph code or other software to control timing and/or order, in which weight and/or other parameter information is to be loaded to configure, logic, including integer and/or floating point units (collectively, arithmetic logic units (ALUs) or simply circuits). In at least one embodiment, code, such as graph code, loads weight or other parameter information into processor ALUs based on an architecture of a neural network to which such code corresponds. In at least one embodiment, code and/or data storage 701 stores weight parameters and/or input/output data of each layer of a neural network trained or used in conjunction with one or more embodiments during forward propagation of input/output data and/or weight parameters during training and/or inferencing using aspects of one or more embodiments. In at least one embodiment, any portion of code and/or data storage 701 may be included with other on-chip or off-chip data storage, including a processor's L1, L2, or L3 cache or system memory.

In at least one embodiment, any portion of code and/or data storage 701 may be internal or external to one or more processors or other hardware logic devices or circuits. In at least one embodiment, code and/or code and/or data storage 701 may be cache memory, dynamic randomly addressable memory ("DRAM"), static randomly addressable memory ("SRAM"), non-volatile memory (e.g., flash memory), or other storage. In at least one embodiment, a choice of whether code and/or code and/or data storage 701 is internal or external to a processor, for example, or comprising DRAM, SRAM, flash or some other storage type may depend on available storage on-chip versus off-chip, latency requirements of training and/or inferencing functions being performed, batch size of data used in inferencing and/or training of a neural network, or some combination of these factors.

In at least one embodiment, inference and/or training logic 715 may include, without limitation, a code and/or data storage 705 to store backward and/or output weight and/or input/output data corresponding to neurons or layers of a neural network trained and/or used for inferencing in aspects of one or more embodiments. In at least one embodiment, code and/or data storage 705 stores weight parameters and/or input/output data of each layer of a neural network trained or used in conjunction with one or more embodiments during backward propagation of input/output data and/or weight parameters during training and/or inferencing using aspects of one or more embodiments. In at least one embodiment, training logic 715 may include, or be coupled to code and/or data storage 705 to store graph code or other software to control timing and/or order, in which weight and/or other parameter information is to be loaded to configure, logic, including integer and/or floating point units (collectively, arithmetic logic units (ALUs)).

In at least one embodiment, code, such as graph code, causes the loading of weight or other parameter information into processor ALUs based on an architecture of a neural network to which such code corresponds. In at least one embodiment, any portion of code and/or data storage 705 may be included with other on-chip or off-chip data storage, including a processor's L1, L2, or L3 cache or system memory. In at least one embodiment, any portion of code and/or data storage 705 may be internal or external to one or more processors or other hardware logic devices or circuits. In at least one embodiment, code and/or data storage 705 may be cache memory, DRAM, SRAM, non-volatile memory (e.g., flash memory), or other storage. In at least one embodiment, a choice of whether code and/or data storage 705 is internal or external to a processor, for example, or comprising DRAM, SRAM, flash memory or some other storage type may depend on available storage on-chip versus off-chip, latency requirements of training and/or inferencing functions being performed, batch size of data used in inferencing and/or training of a neural network, or some combination of these factors.

In at least one embodiment, code and/or data storage 701 and code and/or data storage 705 may be separate storage structures. In at least one embodiment, code and/or data storage 701 and code and/or data storage 705 may be a combined storage structure. In at least one embodiment, code and/or data storage 701 and code and/or data storage 705 may be partially combined and partially separate. In at least one embodiment, any portion of code and/or data storage 701 and code and/or data storage 705 may be included with other on-chip or off-chip data storage, including a processor's L1, L2, or L3 cache or system memory.

In at least one embodiment, inference and/or training logic 715 may include, without limitation, one or more arithmetic logic unit(s) ("ALU(s)") 710, including integer and/or floating point units, to perform logical and/or mathematical operations based, at least in part on, or indicated by, training and/or inference code (e.g., graph code), a result of which may produce activations (e.g., output values from layers or neurons within a neural network) stored in an activation storage 720 that are functions of input/output and/or weight parameter data stored in code and/or data storage 701 and/or code and/or data storage 705. In at least one embodiment, activations stored in activation storage 720 are generated according to linear algebraic and or matrix-based mathematics performed by ALU(s) 710 in response to performing instructions or other code, wherein weight values stored in code and/or data storage 705 and/or data storage 701 are used as operands along with other values, such as bias values, gradient information, momentum values, or other parameters or hyperparameters, any or all of which may be stored in code and/or data storage 705 or code and/or data storage 701 or another storage on or off-chip.

In at least one embodiment, ALU(s) 710 are included within one or more processors or other hardware logic devices or circuits, whereas in another embodiment, ALU(s) 710 may be external to a processor or other hardware logic device or circuit that uses them (e.g., a co-processor). In at least one embodiment, ALU(s) 710 may be included within a processor's execution units or otherwise within a bank of ALUs accessible by a processor's execution units either within same processor or distributed between different processors of different types (e.g., central processing units, graphics processing units, fixed function units, etc.). In at least one embodiment, code and/or data storage 701, code and/or data storage 705, and activation storage 720 may share a processor or other hardware logic device or circuit, whereas in another embodiment, they may be in different processors or other hardware logic devices or circuits, or some combination of same and different processors or other hardware logic devices or circuits. In at least one embodiment, any portion of activation storage 720 may be included with other on-chip or off-chip data storage, including a processor's L1, L2, or L3 cache or system memory. Furthermore, inferencing and/or training code may be stored with other code accessible to a processor or other hardware logic or circuit and fetched and/or processed using a processor's fetch, decode, scheduling, execution, retirement and/or other logical circuits.

In at least one embodiment, activation storage 720 may be cache memory, DRAM, SRAM, non-volatile memory (e.g., flash memory), or other storage. In at least one embodiment, activation storage 720 may be completely or partially within or external to one or more processors or other logical circuits. In at least one embodiment, a choice of whether activation storage 720 is internal or external to a processor, for example, or comprising DRAM, SRAM, flash memory or some other storage type may depend on available storage on-chip versus off-chip, latency requirements of training and/or inferencing functions being performed, batch size of data used in inferencing and/or training of a neural network, or some combination of these factors.

In at least one embodiment, inference and/or training logic 715 illustrated in FIG. 7A may be used in conjunction with an application-specific integrated circuit ("ASIC"), such as a TensorFlow® Processing Unit from Google, an inference processing unit (IPU) from Graphcore™, or a Nervana® (e.g., "Lake Crest") processor from Intel Corp. In at least one embodiment, inference and/or training logic 715 illustrated in FIG. 7A may be used in conjunction with central processing unit ("CPU") hardware, graphics processing unit ("GPU") hardware or other hardware, such as field programmable gate arrays ("FPGAs").

Figure 7B:
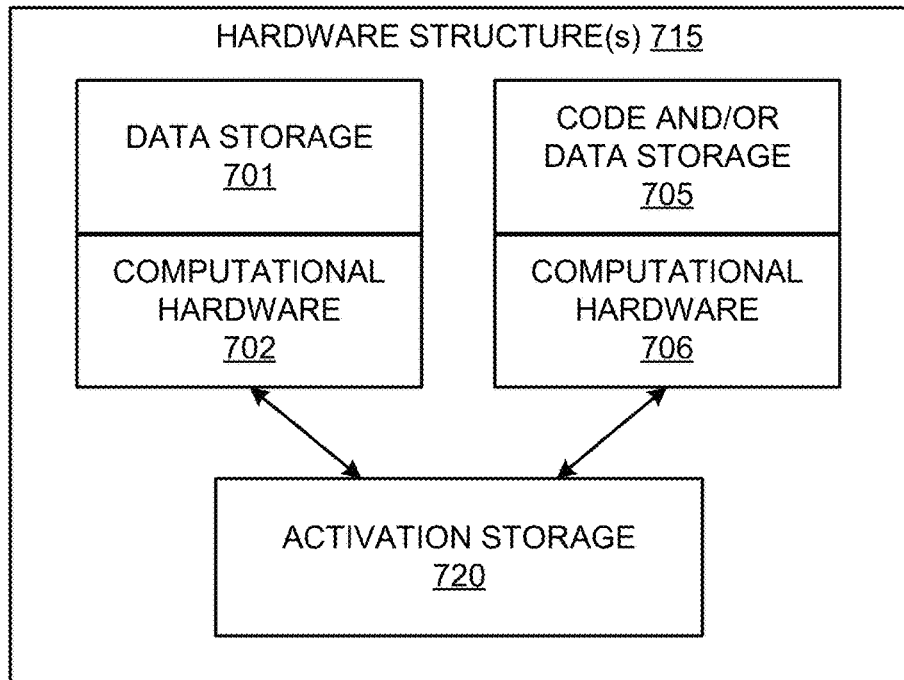
FIG. 7B illustrates inference and/or training logic, according to at least one embodiment.

FIG. 7B illustrates inference and/or training logic 715, according to at least one embodiment. In at least one embodiment, inference and/or training logic 715 may include, without limitation, hardware logic in which computational resources are dedicated or otherwise exclusively used in conjunction with weight values or other information corresponding to one or more layers of neurons within a neural network. In at least one embodiment, inference and/or training logic 715 illustrated in FIG. 7B may be used in conjunction with an application-specific integrated circuit (ASIC), such as TensorFlow® Processing Unit from Google, an inference processing unit (IPU) from Graphcore™, or a Nervana® (e.g., "Lake Crest") processor from Intel Corp. In at least one embodiment, inference and/or training logic 715 illustrated in FIG. 7B may be used in conjunction with central processing unit (CPU) hardware, graphics processing unit (GPU) hardware or other hardware, such as field programmable gate arrays (FPGAs). In at least one embodiment, inference and/or training logic 715 includes, without limitation, code and/or data storage 701 and code and/or data storage 705, which may be used to store code (e.g., graph code), weight values and/or other information, including bias values, gradient information, momentum values, and/or other parameter or hyperparameter information. In at least one embodiment illustrated in FIG. 7B, each of code and/or data storage 701 and code and/or data storage 705 is associated with a dedicated computational resource, such as computational hardware 702 and computational hardware 706, respectively. In at least one embodiment, each of computational hardware 702 and computational hardware 706 comprises one or more ALUs that perform mathematical functions, such as linear algebraic functions, only on information stored in code and/or data storage 701 and code and/or data storage 705, respectively, result of which is stored in activation storage 720.

In at least one embodiment, each of code and/or data storage 701 and 105 and corresponding computational hardware 702 and 706, respectively, correspond to different layers of a neural network, such that resulting activation from one storage/computational pair 701/702 of code and/or data storage 701 and computational hardware 702 is provided as an input to a next storage/computational pair 705/706 of code and/or data storage 705 and computational hardware 706, in order to mirror a conceptual organization of a neural network. In at least one embodiment, each of storage/computational pairs 701/702 and 705/706 may correspond to more than one neural network layer. In at least one embodiment, additional storage/computation pairs (not shown) subsequent to or in parallel with storage/computation pairs 701/702 and 705/706 may be included in inference and/or training logic 715.

Neural Network Training and Deployment

Figure 8:
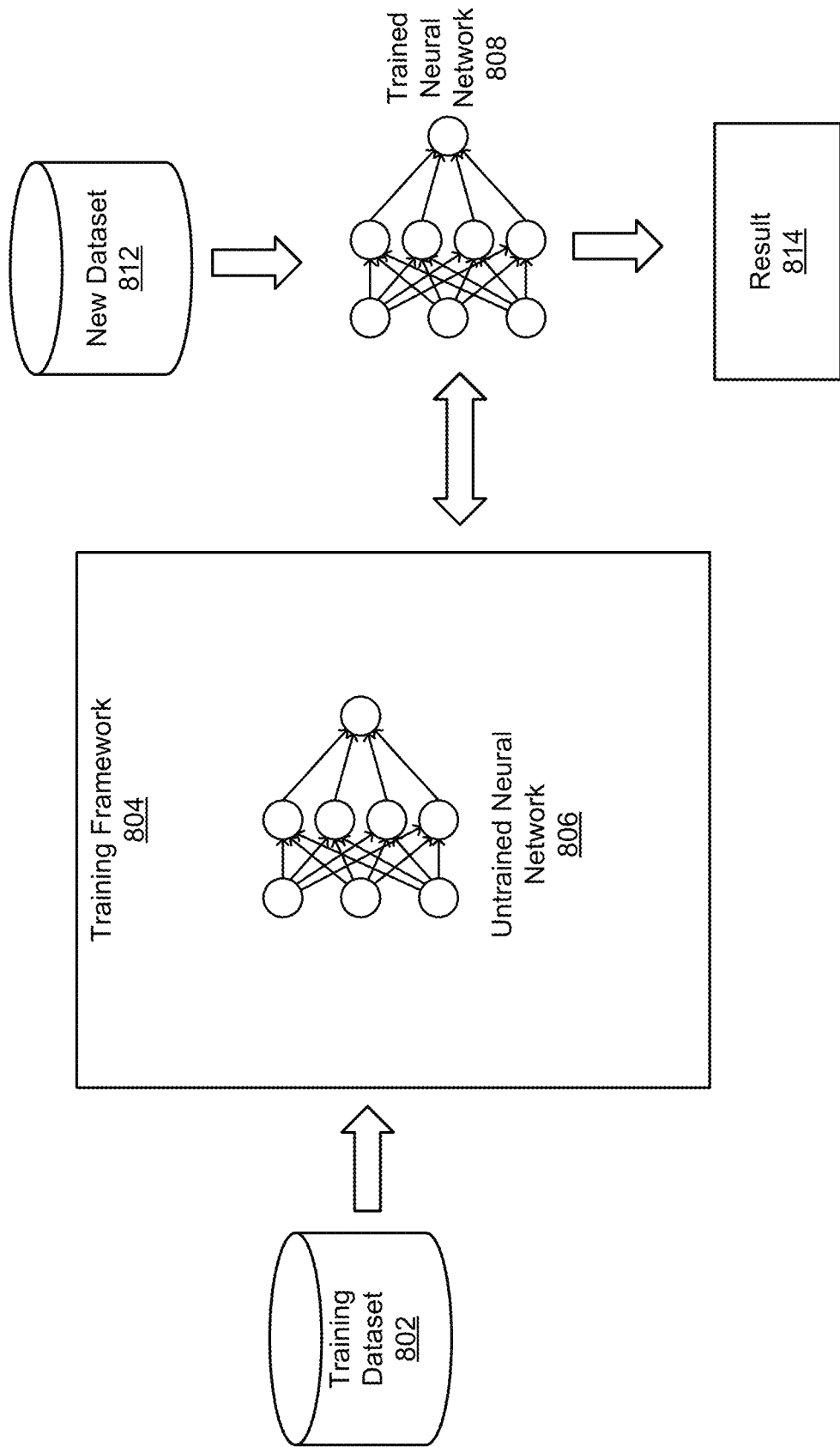
FIG. 8 illustrates training and deployment of a neural network, according to at least one embodiment.

FIG. 8 illustrates training and deployment of a deep neural network, according to at least one embodiment. In at least one embodiment, untrained neural network 806 is trained using a training dataset 802. In at least one embodiment, training framework 804 is a PyTorch framework, whereas in other embodiments, training framework 804 is a Tensor-Flow, Boost, Caffe, Microsoft Cognitive Toolkit/CNTK, MXNet, Chainer, Keras, Deeplearning4j, or other training framework. In at least one embodiment, training framework 804 trains an untrained neural network 806 and enables it to be trained using processing resources described herein to generate a trained neural network 808. In at least one embodiment, weights may be chosen randomly or by pre-training using a deep belief network. In at least one embodiment, training may be performed in either a supervised, partially supervised, or unsupervised manner.

In at least one embodiment, untrained neural network 806 is trained using supervised learning, wherein training dataset 802 includes an input paired with a desired output for an input, or where training dataset 802 includes input having a known output and an output of neural network 806 is manually graded. In at least one embodiment, untrained neural network 806 is trained in a supervised manner and processes inputs from training dataset 802 and compares resulting outputs against a set of expected or desired outputs. In at least one embodiment, errors are then propagated back through untrained neural network 806. In at least one embodiment, training framework 804 adjusts weights that control untrained neural network 806. In at least one embodiment, training framework 804 includes tools to monitor how well untrained neural network 806 is converging towards a model, such as trained neural network 808, suitable to generating correct answers, such as in result 814, based on input data such as a new dataset 812. In at least one embodiment, training framework 804 trains untrained neural network 806 repeatedly while adjust weights to refine an output of untrained neural network 806 using a loss function and adjustment algorithm, such as stochastic gradient descent. In at least one embodiment, training framework 804 trains untrained neural network 806 until untrained neural network 806 achieves a desired accuracy. In at least one embodiment, trained neural network 808 can then be deployed to implement any number of machine learning operations.

In at least one embodiment, untrained neural network 806 is trained using unsupervised learning, wherein untrained neural network 806 attempts to train itself using unlabeled data. In at least one embodiment, unsupervised learning training dataset 802 will include input data without any associated output data or "ground truth" data. In at least one embodiment, untrained neural network 806 can learn groupings within training dataset 802 and can determine how individual inputs are related to untrained dataset 802. In at least one embodiment, unsupervised training can be used to generate a self-organizing map in trained neural network 808 capable of performing operations useful in reducing dimensionality of new dataset 812. In at least one embodiment, unsupervised training can also be used to perform anomaly detection, which allows identification of data points in new dataset 812 that deviate from normal patterns of new dataset 812.

In at least one embodiment, semi-supervised learning may be used, which is a technique in which in training dataset 802 includes a mix of labeled and unlabeled data. In at least one embodiment, training framework 804 may be used to perform incremental learning, such as through transferred learning techniques. In at least one embodiment, incremental learning enables trained neural network 808 to adapt to new dataset 812 without forgetting knowledge instilled within trained neural network 808 during initial training.

Figure 9:
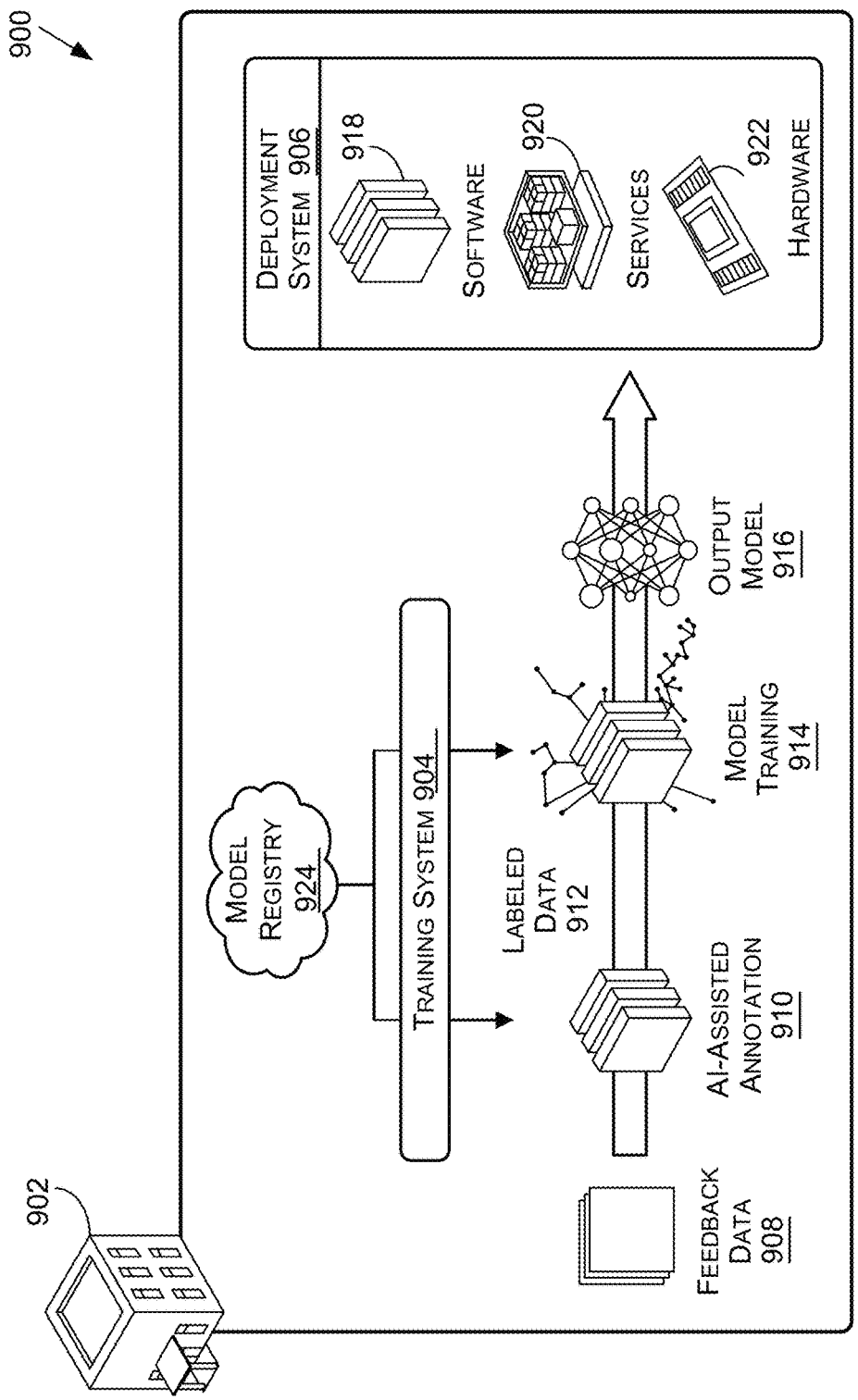
FIG. 9 is an example data flow diagram for an advanced computing pipeline, according to at least one embodiment.

With reference to FIG. 9, FIG. 9 is an example data flow diagram for a process 900 of generating and deploying a processing and inferencing pipeline, according to at least one embodiment. In at least one embodiment, process 900 may be deployed to perform game name recognition analysis and inferencing on user feedback data at one or more facilities 902, such as a data center.

In at least one embodiment, process 900 may be executed within a training system 904 and/or a deployment system 906. In at least one embodiment, training system 904 may be used to perform training, deployment, and embodiment of machine learning models (e.g., neural networks, object detection algorithms, computer vision algorithms, etc.) for use in deployment system 906. In at least one embodiment, deployment system 906 may be configured to offload processing and compute resources among a distributed computing environment to reduce infrastructure requirements at facility 902. In at least one embodiment, deployment system 906 may provide a streamlined platform for selecting, customizing, and implementing virtual instruments for use with computing devices at facility 902. In at least one embodiment, virtual instruments may include software-defined applications for performing one or more processing operations with respect to feedback data. In at least one embodiment, one or more applications in a pipeline may use or call upon services (e.g., inference, visualization, compute, AI, etc.) of deployment system 906 during execution of applications.

In at least one embodiment, some of applications used in advanced processing and inferencing pipelines may use machine learning models or other AI to perform one or more processing steps. In at least one embodiment, machine learning models may be trained at facility 902 using feedback data 908 (such as feedback data) stored at facility 902 or feedback data 908 from another facility or facilities, or a combination thereof. In at least one embodiment, training system 904 may be used to provide applications, services, and/or other resources for generating working, deployable machine learning models for deployment system 906.

In at least one embodiment, a model registry 924 may be backed by object storage that may support versioning and object metadata. In at least one embodiment, object storage may be accessible through, for example, a cloud storage (e.g., a cloud 1026 of FIG. 10) compatible application programming interface (API) from within a cloud platform. In at least one embodiment, machine learning models within model registry 924 may uploaded, listed, modified, or deleted by developers or partners of a system interacting with an API. In at least one embodiment, an API may provide access to methods that allow users with appropriate credentials to associate models with applications, such that models may be executed as part of execution of containerized instantiations of applications.

In at least one embodiment, a training pipeline 1004 (FIG. 10) may include a scenario where facility 902 is training their own machine learning model, or has an existing machine learning model that needs to be optimized or updated. In at least one embodiment, feedback data 908 may be received from various channels, such as forums, web forms, or the like. In at least one embodiment, once feedback data 908 is received, AI-assisted annotation 910 may be used to aid in generating annotations corresponding to feedback data 908 to be used as ground truth data for a machine learning model. In at least one embodiment, AI-assisted annotation 910 may include one or more machine learning models (e.g., convolutional neural networks (CNNs)) that may be trained to generate annotations corresponding to certain types of feedback data 908 (e.g., from certain devices) and/or certain types of anomalies in feedback data 908. In at least one embodiment, AI-assisted annotations 910 may then be used directly, or may be adjusted or fine-tuned using an annotation tool, to generate ground truth data. In at least one embodiment, in some examples, labeled data 912 may be used as ground truth data for training a machine learning model. In at least one embodiment, AI-assisted annotations 910, labeled data 912, or a combination thereof may be used as ground truth data for training a machine learning model. In at least one embodiment, a trained machine learning model may be referred to as an output model 916, and may be used by deployment system 906, as described herein.

In at least one embodiment, training pipeline 1004 (FIG. 10) may include a scenario where facility 902 needs a machine learning model for use in performing one or more processing tasks for one or more applications in deployment system 906, but facility 902 may not currently have such a machine learning model (or may not have a model that is optimized, efficient, or effective for such purposes). In at least one embodiment, an existing machine learning model may be selected from model registry 924. In at least one embodiment, model registry 924 may include machine learning models trained to perform a variety of different inference tasks on imaging data. In at least one embodiment, machine learning models in model registry 924 may have been trained on imaging data from different facilities than facility 902 (e.g., facilities remotely located). In at least one embodiment, machine learning models may have been trained on imaging data from one location, two locations, or any number of locations. In at least one embodiment, when being trained on imaging data from a specific location, training may take place at that location, or at least in a manner that protects confidentiality of imaging data or restricts imaging data from being transferred off-premises (e.g., to comply with HIPAA regulations, privacy regulations, etc.). In at least one embodiment, once a model is trained—or partially trained—at one location, a machine learning model may be added to model registry 924. In at least one embodiment, a machine learning model may then be retrained, or updated, at any number of other facilities, and a retrained or updated model may be made available in model registry 924. In at least one embodiment, a machine learning model may then be selected from model registry 924—and referred to as output model 916—and may be used in deployment system 906 to perform one or more processing tasks for one or more applications of a deployment system.

In at least one embodiment, training pipeline 1004 (FIG. 10) may be used in a scenario that includes facility 902 requiring a machine learning model for use in performing one or more processing tasks for one or more applications in deployment system 906, but facility 902 may not currently have such a machine learning model (or may not have a model that is optimized, efficient, or effective for such purposes). In at least one embodiment, a machine learning model selected from model registry 924 might not be fine-tuned or optimized for feedback data 908 generated at facility 902 because of differences in populations, genetic variations, robustness of training data used to train a machine learning model, diversity in anomalies of training data, and/or other issues with training data. In at least one embodiment, AI-assisted annotation 910 may be used to aid in generating annotations corresponding to feedback data 908 to be used as ground truth data for retraining or updating a machine learning model. In at least one embodiment, labeled data 912 may be used as ground truth data for training a machine learning model. In at least one embodiment, retraining or updating a machine learning model may be referred to as model training 914. In at least one embodiment, model training 914—e.g., AI-assisted annotations 910, labeled data 912, or a combination thereof—may be used as ground truth data for retraining or updating a machine learning model.

In at least one embodiment, deployment system 906 may include software 918, services 920, hardware 922, and/or other components, features, and functionality. In at least one embodiment, deployment system 906 may include a software "stack," such that software 918 may be built on top of services 920 and may use services 920 to perform some or all of processing tasks, and services 920 and software 918 may be built on top of hardware 922 and use hardware 922 to execute processing, storage, and/or other compute tasks of deployment system 906.

In at least one embodiment, software 918 may include any number of different containers, where each container may execute an instantiation of an application. In at least one embodiment, each application may perform one or more processing tasks in an advanced processing and inferencing pipeline (e.g., inferencing, object detection, feature detection, segmentation, image enhancement, calibration, etc.). In at least one embodiment, for each type of computing device there may be any number of containers that may perform a data processing task with respect to feedback data 908 (or other data types, such as those described herein). In at least one embodiment, an advanced processing and inferencing pipeline may be defined based on selections of different containers that are desired or required for processing feedback data 908, in addition to containers that receive and configure imaging data for use by each container and/or for use by facility 902 after processing through a pipeline (e.g., to convert outputs back to a usable data type for storage and display at facility 902). In at least one embodiment, a combination of containers within software 918 (e.g., that make up a pipeline) may be referred to as a virtual instrument (as described in more detail herein), and a virtual instrument may leverage services 920 and hardware 922 to execute some or all processing tasks of applications instantiated in containers.

In at least one embodiment, data may undergo pre-processing as part of data processing pipeline to prepare data for processing by one or more applications. In at least one embodiment, post-processing may be performed on an output of one or more inferencing tasks or other processing tasks of a pipeline to prepare an output data for a next application and/or to prepare output data for transmission and/or use by a user (e.g., as a response to an inference request). In at least one embodiment, inferencing tasks may be performed by one or more machine learning models, such as trained or deployed neural networks, which may include output models 916 of training system 904.

In at least one embodiment, tasks of data processing pipeline may be encapsulated in a container(s) that each represent a discrete, fully functional instantiation of an application and virtualized computing environment that is able to reference machine learning models. In at least one embodiment, containers or applications may be published into a private (e.g., limited access) area of a container registry (described in more detail herein), and trained or deployed models may be stored in model registry 924 and associated with one or more applications. In at least one embodiment, images of applications (e.g., container images) may be available in a container registry, and once selected by a user from a container registry for deployment in a pipeline, an image may be used to generate a container for an instantiation of an application for use by a user's system.

In at least one embodiment, developers may develop, publish, and store applications (e.g., as containers) for performing processing and/or inferencing on supplied data. In at least one embodiment, development, publishing, and/or storing may be performed using a software development kit (SDK) associated with a system (e.g., to ensure that an application and/or container developed is compliant with or compatible with a system). In at least one embodiment, an application that is developed may be tested locally (e.g., at a first facility, on data from a first facility) with an SDK which may support at least some of services 920 as a system (e.g., system 1000 of FIG. 10). In at least one embodiment, once validated by system 1000 (e.g., for accuracy, etc.), an application may be available in a container registry for selection and/or embodiment by a user (e.g., a hospital, clinic, lab, healthcare provider, etc.) to perform one or more processing tasks with respect to data at a facility (e.g., a second facility) of a user.

Figure 10:
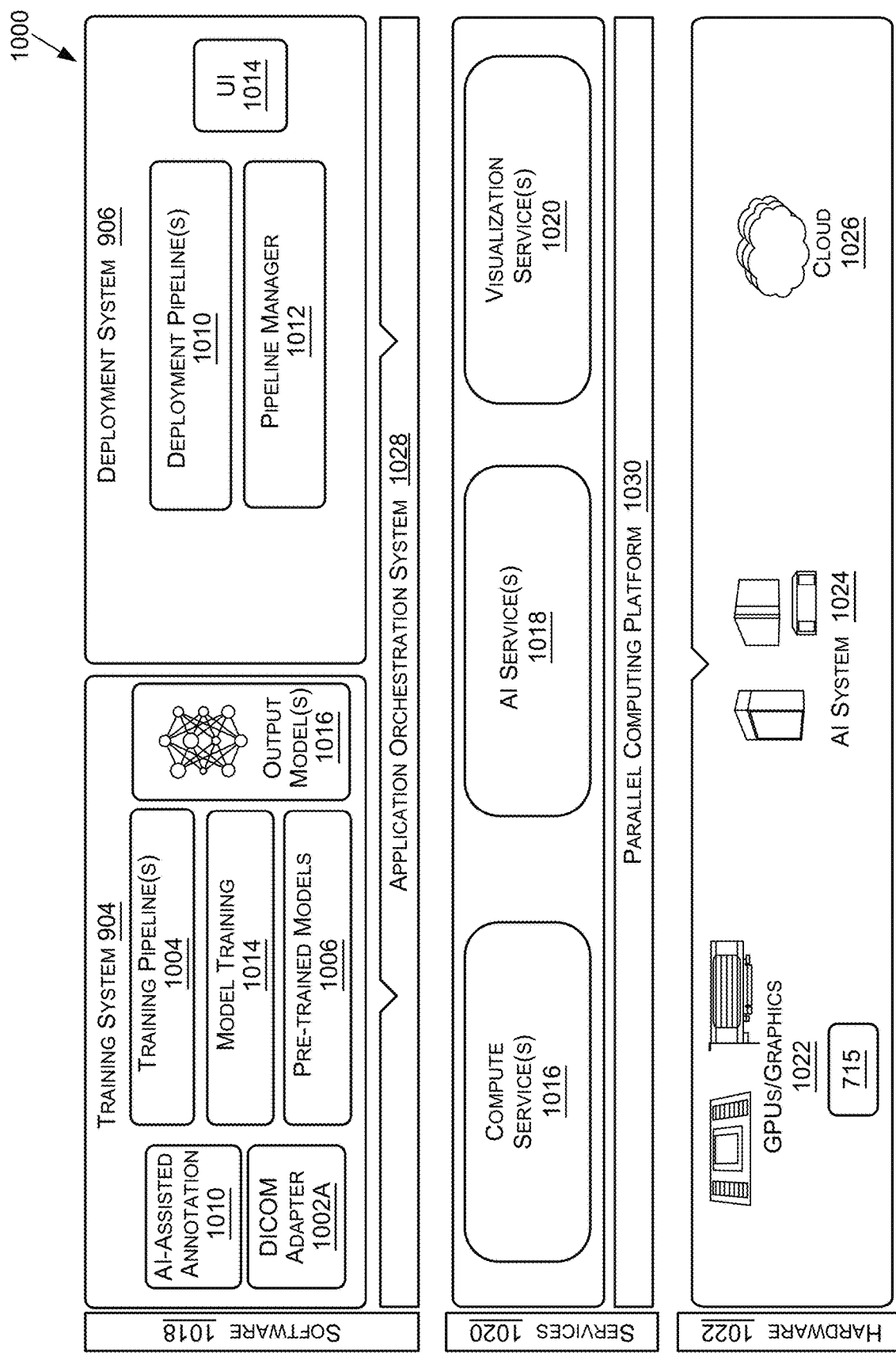
FIG. 10 is a system diagram for an example system for training, adapting, instantiating and deploying machine learning models in an advanced computing pipeline, according to at least one embodiment.

In at least one embodiment, developers may then share applications or containers through a network for access and use by users of a system (e.g., system 1000 of FIG. 10). In at least one embodiment, completed and validated applications or containers may be stored in a container registry and associated machine learning models may be stored in model registry 924. In at least one embodiment, a requesting entity—who provides an inference or image processing request—may browse a container registry and/or model registry 924 for an application, container, dataset, machine learning model, etc., select a desired combination of elements for inclusion in data processing pipeline, and submit an processing request. In at least one embodiment, a request may include input data that is necessary to perform a request, and/or may include a selection of application(s) and/or machine learning models to be executed in processing a request. In at least one embodiment, a request may then be passed to one or more components of deployment system 906 (e.g., a cloud) to perform processing of data processing pipeline. In at least one embodiment, processing by deployment system 906 may include referencing selected elements (e.g., applications, containers, models, etc.) from a container registry and/or model registry 924. In at least one embodiment, once results are generated by a pipeline, results may be returned to a user for reference (e.g., for viewing in a viewing application suite executing on a local, on-premises workstation or terminal).

In at least one embodiment, to aid in processing or execution of applications or containers in pipelines, services 920 may be leveraged. In at least one embodiment, services 920 may include compute services, artificial intelligence (AI) services, visualization services, and/or other service types. In at least one embodiment, services 920 may provide functionality that is common to one or more applications in software 918, so functionality may be abstracted to a service that may be called upon or leveraged by applications. In at least one embodiment, functionality provided by services 920 may run dynamically and more efficiently, while also scaling well by allowing applications to process data in parallel (e.g., using a parallel computing platform 1030 (FIG. 10)). In at least one embodiment, rather than each application that shares a same functionality offered by a service 920 being required to have a respective instance of service 920, service 920 may be shared between and among various applications. In at least one embodiment, services may include an inference server or engine that may be used for executing detection or segmentation tasks, as non-limiting examples. In at least one embodiment, a model training service may be included that may provide machine learning model training and/or retraining capabilities.

In at least one embodiment, where a service 920 includes an AI service (e.g., an inference service), one or more machine learning models associated with an application for anomaly detection (e.g., tumors, growth abnormalities, scarring, etc.) may be executed by calling upon (e.g., as an API call) an inference service (e.g., an inference server) to execute machine learning model(s), or processing thereof, as part of application execution. In at least one embodiment, where another application includes one or more machine learning models for segmentation tasks, an application may call upon an inference service to execute machine learning models for performing one or more of processing operations associated with segmentation tasks. In at least one embodiment, software 918 implementing advanced processing and inferencing pipeline may be streamlined because each application may call upon a same inference service to perform one or more inferencing tasks.

In at least one embodiment, hardware 922 may include GPUs, CPUs, graphics cards, an AI/deep learning system (e.g., an AI supercomputer, such as NVIDIA's DGX supercomputer system), a cloud platform, or a combination thereof. In at least one embodiment, different types of hardware 922 may be used to provide efficient, purpose-built support for software 918 and services 920 in deployment system 906. In at least one embodiment, use of GPU processing may be implemented for processing locally (e.g., at facility 902), within an AI/deep learning system, in a cloud system, and/or in other processing components of deployment system 906 to improve efficiency, accuracy, and efficacy of game name recognition.

In at least one embodiment, software 918 and/or services 920 may be optimized for GPU processing with respect to deep learning, machine learning, and/or high-performance computing, as non-limiting examples. In at least one embodiment, at least some of computing environment of deployment system 906 and/or training system 904 may be executed in a datacenter one or more supercomputers or high performance computing systems, with GPU optimized software (e.g., hardware and software combination of NVIDIA's DGX system). In at least one embodiment, hardware 922 may include any number of GPUs that may be called upon to perform processing of data in parallel, as described herein. In at least one embodiment, cloud platform may further include GPU processing for GPU-optimized execution of deep learning tasks, machine learning tasks, or other computing tasks. In at least one embodiment, cloud platform (e.g., NVIDIA's NGC) may be executed using an AI/deep learning supercomputer(s) and/or GPU-optimized software (e.g., as provided on NVIDIA's DGX systems) as a hardware abstraction and scaling platform. In at least one embodiment, cloud platform may integrate an application container clustering system or orchestration system (e.g., KUBERNETES) on multiple GPUs to enable seamless scaling and load balancing.

FIG. 10 is a system diagram for an example system 1000 for generating and deploying a deployment pipeline, according to at least one embodiment. In at least one embodiment, system 1000 may be used to implement process 900 of FIG. 9 and/or other processes including advanced processing and inferencing pipelines. In at least one embodiment, system 1000 may include training system 904 and deployment system 906. In at least one embodiment, training system 904 and deployment system 906 may be implemented using software 918, services 920, and/or hardware 922, as described herein.

In at least one embodiment, system 1000 (e.g., training system 904 and/or deployment system 3006) may implemented in a cloud computing environment (e.g., using cloud 1026). In at least one embodiment, system 1000 may be implemented locally with respect to a facility, or as a combination of both cloud and local computing resources. In at least one embodiment, access to APIs in cloud 1026 may be restricted to authorized users through enacted security measures or protocols. In at least one embodiment, a security protocol may include web tokens that may be signed by an authentication (e.g., AuthN, AuthZ, Gluecon, etc.) service and may carry appropriate authorization. In at least one embodiment, APIs of virtual instruments (described herein), or other instantiations of system 1000, may be restricted to a set of public IPs that have been vetted or authorized for interaction.

In at least one embodiment, various components of system 1000 may communicate between and among one another using any of a variety of different network types, including but not limited to local area networks (LANs) and/or wide area networks (WANs) via wired and/or wireless communication protocols. In at least one embodiment, communication between facilities and components of system 1000 (e.g., for transmitting inference requests, for receiving results of inference requests, etc.) may be communicated over a data bus or data busses, wireless data protocols (Wi-Fi), wired data protocols (e.g., Ethernet), etc.

In at least one embodiment, training system 904 may execute training pipelines 1004, similar to those described herein with respect to FIG. 9. In at least one embodiment, where one or more machine learning models are to be used in deployment pipelines 1010 by deployment system 906, training pipelines 1004 may be used to train or retrain one or more (e.g., pre-trained) models, and/or implement one or more of pre-trained models 1006 (e.g., without a need for retraining or updating). In at least one embodiment, as a result of training pipelines 1004, output model(s) 916 may be generated. In at least one embodiment, training pipelines 1004 may include any number of processing steps, AI-assisted annotation 910, labeling or annotating of feedback data 908 to generate labeled data 912, model selection from a model registry, model training 914, training, retraining, or updating models, and/or other processing steps. In at least one embodiment, for different machine learning models used by deployment system 906, different training pipelines 1004 may be used. In at least one embodiment, training pipeline 1004 similar to a first example described with respect to FIG. 9 may be used for a first machine learning model, training pipeline 1004 similar to a second example described with respect to FIG. 9 may be used for a second machine learning model, and training pipeline 1004 similar to a third example described with respect to FIG. 9 may be used for a third machine learning model. In at least one embodiment, any combination of tasks within training system 904 may be used depending on what is required for each respective machine learning model. In at least one embodiment, one or more of machine learning models may already be trained and ready for deployment so machine learning models may not undergo any processing by training system 904, and may be implemented by deployment system 906.

In at least one embodiment, output model(s) 916 and/or pre-trained model(s) 1006 may include any types of machine learning models depending on embodiment or embodiment. In at least one embodiment, and without limitation, machine learning models used by system 1000 may include machine learning model(s) using linear regression, logistic regression, decision trees, support vector machines (SVM), Naïve Bayes, k-nearest neighbor (Knn), K means clustering, random forest, dimensionality reduction algorithms, gradient boosting algorithms, neural networks (e.g., auto-encoders, convolutional, recurrent, perceptrons, Long/Short Term Memory (LSTM), Bi-LSTM, Hopfield, Boltzmann, deep belief, deconvolutional, generative adversarial, liquid state machine, etc.), and/or other types of machine learning models.

In at least one embodiment, training pipelines 1004 may include AI-assisted annotation. In at least one embodiment, labeled data 912 (e.g., traditional annotation) may be generated by any number of techniques. In at least one embodiment, labels or other annotations may be generated within a drawing program (e.g., an annotation program), a computer aided design (CAD) program, a labeling program, another type of program suitable for generating annotations or labels for ground truth, and/or may be hand drawn, in some examples. In at least one embodiment, ground truth data may be synthetically produced (e.g., generated from computer models or renderings), real produced (e.g., designed and produced from real-world data), machine-automated (e.g., using feature analysis and learning to extract features from data and then generate labels), human annotated (e.g., labeler, or annotation expert, defines location of labels), and/or a combination thereof. In at least one embodiment, for each instance of feedback data 908 (or other data type used by machine learning models), there may be corresponding ground truth data generated by training system 904. In at least one embodiment, AI-assisted annotation may be performed as part of deployment pipelines 1010; either in addition to, or in lieu of AI-assisted annotation included in training pipelines 1004. In at least one embodiment, system 1000 may include a multi-layer platform that may include a software layer (e.g., software 918) of diagnostic applications (or other application types) that may perform one or more medical imaging and diagnostic functions.

In at least one embodiment, a software layer may be implemented as a secure, encrypted, and/or authenticated API through which applications or containers may be invoked (e.g., called) from an external environment(s) (e.g., facility 902). In at least one embodiment, applications may then call or execute one or more services 920 for performing compute, AI, or visualization tasks associated with respective applications, and software 918 and/or services 920 may leverage hardware 922 to perform processing tasks in an effective and efficient manner.

In at least one embodiment, deployment system 906 may execute deployment pipelines 1010. In at least one embodiment, deployment pipelines 1010 may include any number of applications that may be sequentially, non-sequentially, or otherwise applied to feedback data (and/or other data types)—including AI-assisted annotation, as described above. In at least one embodiment, as described herein, a deployment pipeline 1010 for an individual device may be referred to as a virtual instrument for a device. In at least one embodiment, for a single device, there may be more than one deployment pipeline 1010 depending on information desired from data generated by a device.

In at least one embodiment, applications available for deployment pipelines 1010 may include any application that may be used for performing processing tasks on feedback data or other data from devices. In at least one embodiment, because various applications may share common image operations, in some embodiments, a data augmentation library (e.g., as one of services 920) may be used to accelerate these operations. In at least one embodiment, to avoid bottlenecks of conventional processing approaches that rely on CPU processing, parallel computing platform 1030 may be used for GPU acceleration of these processing tasks.

In at least one embodiment, deployment system 906 may include a user interface 1014 (e.g., a graphical user interface, a web interface, etc.) that may be used to select applications for inclusion in deployment pipeline(s) 1010, arrange applications, modify or change applications or parameters or constructs thereof, use and interact with deployment pipeline(s) 1010 during set-up and/or deployment, and/or to otherwise interact with deployment system 906. In at least one embodiment, although not illustrated with respect to training system 904, user interface 1014 (or a different user interface) may be used for selecting models for use in deployment system 906, for selecting models for training, or retraining, in training system 904, and/or for otherwise interacting with training system 904.

In at least one embodiment, pipeline manager 1012 may be used, in addition to an application orchestration system 1028, to manage interaction between applications or containers of deployment pipeline(s) 1010 and services 920 and/or hardware 922. In at least one embodiment, pipeline manager 1012 may be configured to facilitate interactions from application to application, from application to service 920, and/or from application or service to hardware 922. In at least one embodiment, although illustrated as included in software 918, this is not intended to be limiting, and in some examples pipeline manager 1012 may be included in services 920. In at least one embodiment, application orchestration system 1028 (e.g., Kubernetes, DOCKER, etc.) may include a container orchestration system that may group applications into containers as logical units for coordination, management, scaling, and deployment. In at least one embodiment, by associating applications from deployment pipeline(s) 1010 (e.g., a reconstruction application, a segmentation application, etc.) with individual containers, each application may execute in a self-contained environment (e.g., at a kernel level) to increase speed and efficiency.

In at least one embodiment, each application and/or container (or image thereof) may be individually developed, modified, and deployed (e.g., a first user or developer may develop, modify, and deploy a first application and a second user or developer may develop, modify, and deploy a second application separate from a first user or developer), which may allow for focus on, and attention to, a task of a single application and/or container(s) without being hindered by tasks of another application(s) or container(s). In at least one embodiment, communication, and cooperation between different containers or applications may be aided by pipeline manager 1012 and application orchestration system 1028. In at least one embodiment, so long as an expected input and/or output of each container or application is known by a system (e.g., based on constructs of applications or containers), application orchestration system 1028 and/or pipeline manager 1012 may facilitate communication among and between, and sharing of resources among and between, each of applications or containers. In at least one embodiment, because one or more of applications or containers in deployment pipeline(s) 1010 may share same services and resources, application orchestration system 1028 may orchestrate, load balance, and determine sharing of services or resources between and among various applications or containers. In at least one embodiment, a scheduler may be used to track resource requirements of applications or containers, current usage or planned usage of these resources, and resource availability. In at least one embodiment, a scheduler may thus allocate resources to different applications and distribute resources between and among applications in view of requirements and availability of a system. In some examples, a scheduler (and/or other component of application orchestration system 1028) may determine resource availability and distribution based on constraints imposed on a system (e.g., user constraints), such as quality of service (QoS), urgency of need for data outputs (e.g., to determine whether to execute real-time processing or delayed processing), etc.

In at least one embodiment, services 920 leveraged by and shared by applications or containers in deployment system 906 may include compute services 1016, AI services 1018, visualization services 1020, and/or other service types. In at least one embodiment, applications may call (e.g., execute) one or more of services 920 to perform processing operations for an application. In at least one embodiment, compute services 1016 may be leveraged by applications to perform super-computing or other high-performance computing (HPC) tasks. In at least one embodiment, compute service(s) 1016 may be leveraged to perform parallel processing (e.g., using a parallel computing platform 1030) for processing data through one or more of applications and/or one or more tasks of a single application, substantially simultaneously. In at least one embodiment, parallel computing platform 1030 (e.g., NVIDIA's CUDA) may enable general purpose computing on GPUs (GPGPU) (e.g., GPUs 1022). In at least one embodiment, a software layer of parallel computing platform 1030 may provide access to virtual instruction sets and parallel computational elements of GPUs, for execution of compute kernels. In at least one embodiment, parallel computing platform 1030 may include memory and, in some embodiments, a memory may be shared between and among multiple containers, and/or between and among different processing tasks within a single container. In at least one embodiment, inter-process communication (IPC) calls may be generated for multiple containers and/or for multiple processes within a container to use same data from a shared segment of memory of parallel computing platform 1030 (e.g., where multiple different stages of an application or multiple applications are processing same information). In at least one embodiment, rather than making a copy of data and moving data to different locations in memory (e.g., a read/write operation), same data in same location of a memory may be used for any number of processing tasks (e.g., at a same time, at different times, etc.). In at least one embodiment, as data is used to generate new data as a result of processing, this information of a new location of data may be stored and shared between various applications. In at least one embodiment, location of data and a location of updated or modified data may be part of a definition of how a payload is understood within containers.

In at least one embodiment, AI services 1018 may be leveraged to perform inferencing services for executing machine learning model(s) associated with applications (e.g., tasked with performing one or more processing tasks of an application). In at least one embodiment, AI services 1018 may leverage AI system 1024 to execute machine learning model(s) (e.g., neural networks, such as CNNs) for segmentation, reconstruction, object detection, feature detection, classification, and/or other inferencing tasks. In at least one embodiment, applications of deployment pipeline(s) 1010 may use one or more of output models 916 from training system 904 and/or other models of applications to perform inference on imaging data (e.g., DICOM data, RIS data, CIS data, REST compliant data, RPC data, raw data, etc.). In at least one embodiment, two or more examples of inferencing using application orchestration system 1028 (e.g., a scheduler) may be available. In at least one embodiment, a first category may include a high priority/low latency path that may achieve higher service level agreements, such as for performing inference on urgent requests during an emergency, or for a radiologist during diagnosis. In at least one embodiment, a second category may include a standard priority path that may be used for requests that may be non-urgent or where analysis may be performed at a later time. In at least one embodiment, application orchestration system 1028 may distribute resources (e.g., services 920 and/or hardware 922) based on priority paths for different inferencing tasks of AI services 1018.

In at least one embodiment, shared storage may be mounted to AI services 1018 within system 1000. In at least one embodiment, shared storage may operate as a cache (or other storage device type) and may be used to process inference requests from applications. In at least one embodiment, when an inference request is submitted, a request may be received by a set of API instances of deployment system 906, and one or more instances may be selected (e.g., for best fit, for load balancing, etc.) to process a request. In at least one embodiment, to process a request, a request may be entered into a database, a machine learning model may be located from model registry 924 if not already in a cache, a validation step may ensure appropriate machine learning model is loaded into a cache (e.g., shared storage), and/or a copy of a model may be saved to a cache. In at least one embodiment, a scheduler (e.g., of pipeline manager 1012) may be used to launch an application that is referenced in a request if an application is not already running or if there are not enough instances of an application. In at least one embodiment, if an inference server is not already launched to execute a model, an inference server may be launched. In at least one embodiment, any number of inference servers may be launched per model. In at least one embodiment, in a pull model, in which inference servers are clustered, models may be cached whenever load balancing is advantageous. In at least one embodiment, inference servers may be statically loaded in corresponding, distributed servers.

In at least one embodiment, inferencing may be performed using an inference server that runs in a container. In at least one embodiment, an instance of an inference server may be associated with a model (and optionally a plurality of versions of a model). In at least one embodiment, if an instance of an inference server does not exist when a request to perform inference on a model is received, a new instance may be loaded. In at least one embodiment, when starting an inference server, a model may be passed to an inference server such that a same container may be used to serve different models so long as inference server is running as a different instance.

In at least one embodiment, during application execution, an inference request for a given application may be received, and a container (e.g., hosting an instance of an inference server) may be loaded (if not already), and a start procedure may be called. In at least one embodiment, pre-processing logic in a container may load, decode, and/or perform any additional pre-processing on incoming data (e.g., using a CPU(s) and/or GPU(s)). In at least one embodiment, once data is prepared for inference, a container may perform inference as necessary on data. In at least one embodiment, this may include a single inference call on one image (e.g., a hand X-ray), or may require inference on hundreds of images (e.g., a chest CT). In at least one embodiment, an application may summarize results before completing, which may include, without limitation, a single confidence score, pixel level-segmentation, voxel-level segmentation, generating a visualization, or generating text to summarize findings. In at least one embodiment, different models or applications may be assigned different priorities. For example, some models may have a real-time (TAT less than one minute) priority while others may have lower priority (e.g., TAT less than 10 minutes). In at least one embodiment, model execution times may be measured from requesting institution or entity and may include partner network traversal time, as well as execution on an inference service.

In at least one embodiment, transfer of requests between services 920 and inference applications may be hidden behind a software development kit (SDK), and robust transport may be provide through a queue. In at least one embodiment, a request will be placed in a queue via an API for an individual application/tenant ID combination and an SDK will pull a request from a queue and give a request to an application. In at least one embodiment, a name of a queue may be provided in an environment from where an SDK will pick it up. In at least one embodiment, asynchronous communication through a queue may be useful as it may allow any instance of an application to pick up work as it becomes available. In at least one embodiment, results may be transferred back through a queue, to ensure no data is lost. In at least one embodiment, queues may also provide an ability to segment work, as highest priority work may go to a queue with most instances of an application connected to it, while lowest priority work may go to a queue with a single instance connected to it that processes tasks in an order received. In at least one embodiment, an application may run on a GPU-accelerated instance generated in cloud 1026, and an inference service may perform inferencing on a GPU.

In at least one embodiment, visualization services 1020 may be leveraged to generate visualizations for viewing outputs of applications and/or deployment pipeline(s) 1010. In at least one embodiment, GPUs 1022 may be leveraged by visualization services 1020 to generate visualizations. In at least one embodiment, rendering effects, such as ray-tracing, may be implemented by visualization services 1020 to generate higher quality visualizations. In at least one embodiment, visualizations may include, without limitation, 2D image renderings, 3D volume renderings, 3D volume reconstruction, 2D tomographic slices, virtual reality displays, augmented reality displays, etc. In at least one embodiment, virtualized environments may be used to generate a virtual interactive display or environment (e.g., a virtual environment) for interaction by users of a system (e.g., doctors, nurses, radiologists, etc.). In at least one embodiment, visualization services 1020 may include an internal visualizer, cinematics, and/or other rendering or image processing capabilities or functionality (e.g., ray tracing, rasterization, internal optics, etc.).

In at least one embodiment, hardware 922 may include GPUs 1022, AI system 1024, cloud 1026, and/or any other hardware used for executing training system 904 and/or deployment system 906. In at least one embodiment, GPUs 1022 (e.g., NVIDIA's TESLA and/or QUADRO GPUs) may include any number of GPUs that may be used for executing processing tasks of compute services 1016, AI services 1018, visualization services 1020, other services, and/or any of features or functionality of software 918. For example, with respect to AI services 1018, GPUs 1022 may be used to perform pre-processing on imaging data (or other data types used by machine learning models), post-processing on outputs of machine learning models, and/or to perform inferencing (e.g., to execute machine learning models). In at least one embodiment, cloud 1026, AI system 1024, and/or other components of system 1000 may use GPUs 1022. In at least one embodiment, cloud 1026 may include a GPU-optimized platform for deep learning tasks. In at least one embodiment, AI system 1024 may use GPUs, and cloud 1026—or at least a portion tasked with deep learning or inferencing—may be executed using one or more AI systems 1024. As such, although hardware 922 is illustrated as discrete components, this is not intended to be limiting, and any components of hardware 922 may be combined with, or leveraged by, any other components of hardware 922.

In at least one embodiment, AI system 1024 may include a purpose-built computing system (e.g., a super-computer or an HPC) configured for inferencing, deep learning, machine learning, and/or other artificial intelligence tasks. In at least one embodiment, AI system 1024 (e.g., NVIDIA's DGX) may include GPU-optimized software (e.g., a software stack) that may be executed using a plurality of GPUs 1022, in addition to CPUs, RAM, storage, and/or other components, features, or functionality. In at least one embodiment, one or more AI systems 1024 may be implemented in cloud 1026 (e.g., in a data center) for performing some or all of AI-based processing tasks of system 1000.

In at least one embodiment, cloud 1026 may include a GPU-accelerated infrastructure (e.g., NVIDIA's NGC) that may provide a GPU-optimized platform for executing processing tasks of system 1000. In at least one embodiment, cloud 1026 may include an AI system(s) 1024 for performing one or more of AI-based tasks of system 1000 (e.g., as a hardware abstraction and scaling platform). In at least one embodiment, cloud 1026 may integrate with application orchestration system 1028 leveraging multiple GPUs to enable seamless scaling and load balancing between and among applications and services 920. In at least one embodiment, cloud 1026 may tasked with executing at least some of services 920 of system 1000, including compute services 1016, AI services 1018, and/or visualization services 1020, as described herein. In at least one embodiment, cloud 1026 may perform small and large batch inference (e.g., executing NVIDIA's TENSOR RT), provide an accelerated parallel computing API and platform 1030 (e.g., NVIDIA's CUDA), execute application orchestration system 1028 (e.g., KUBERNETES), provide a graphics rendering API and platform (e.g., for ray-tracing, 2D graphics, 3D graphics, and/or other rendering techniques to produce higher quality cinematics), and/or may provide other functionality for system 1000.

In at least one embodiment, in an effort to preserve patient confidentiality (e.g., where patient data or records are to be used off-premises), cloud 1026 may include a registry—such as a deep learning container registry. In at least one embodiment, a registry may store containers for instantiations of applications that may perform pre-processing, post-processing, or other processing tasks on patient data. In at least one embodiment, cloud 1026 may receive data that includes patient data as well as sensor data in containers, perform requested processing for just sensor data in those containers, and then forward a resultant output and/or visualizations to appropriate parties and/or devices (e.g., on-premises medical devices used for visualization or diagnoses), all without having to extract, store, or otherwise access patient data. In at least one embodiment, confidentiality of patient data is preserved in compliance with HIPAA and/or other data regulations.

At least one embodiment of the disclosure can be described in view of the following clauses:

In clause 1, a method comprising: applying an input image to a first machine learning model (MLM) to identify a plurality of regions of interest (ROIs) within the input image, wherein the first MLM is trained to identify the plurality of ROIs based, at least in part, on a plurality of reference features detected within the input image and one or more geometric relationships between each reference feature and one or more locations associated with an ROI type of a plurality of ROI types; and providing each of the identified plurality of ROIs as input to a respective one of a plurality of second MLMs to obtain an output of the respective second MLM, wherein the respective second MLM corresponds to one of the plurality of ROI types, and the output of the respective second MLM indicates one or more objects within an ROI of the corresponding ROI type.

In clause 2, the method of clause 1, wherein the input image is a multi-dimensional image of a first dimensionality, the first MLM is trained to detect the plurality of reference features based at least in part on processing a plurality of sectional images associated with the multi-dimensional image, each of the plurality of sectional images being of a second dimensionality and representing a section of the input image, and wherein the second dimensionality is lower than the first dimensionality.

In clause 3, the method of clause 1, wherein the first MLM is trained based on a plurality of training images having reference features of a type common with a type of the reference features within the input image.

In clause 4, the method of clause 1, wherein the first MLM comprises a neural network with at least one hidden layer.

In clause 5, the method of clause 1, wherein the input image is a medical image of a patient and the plurality of reference features are associated with one or more bones of the patient depicted by the input image.

In clause 6, the method of clause 5, wherein a first ROI of the plurality of ROIs comprises a representation of at least a portion of a first organ of the patient and excludes a representation of any portion of a second organ of the patient.

In clause 7, the method of clause 6, wherein a second ROI of the plurality of ROIs comprises the representation of at least a portion of the second organ.

In clause 8, the method of clause 1, wherein providing each of the plurality of ROIs to the respective one of the plurality of second MLMs comprises providing at least one of a location of the respective ROI within the input image or a representation of the respective ROI.

In clause 9, the method of clause 1, wherein applying the first MLM to the input image comprises executing one or more computations associated with the first MLM on one or more graphics processing units.

In clause 10, a method comprising: generating first training data comprising a first training input and a first target output, wherein the first training input comprises an intensity map of a first training image, and the first target output comprises first annotation data identifying a plurality of regions of interest (ROIs) in the first training image; providing the first training data to train a segmentation machine learning model (MLM) on a first set of training inputs comprising the first training input, and a first set of target outputs comprising the first target output, wherein the segmentation MLM uses (i) the intensity map to identify a plurality of reference features within the first training image and (ii) the annotation data to identify one or more geometric relationships between each reference feature and one or more respective ROIs of the plurality of ROIs; generating second training data comprising a second training input and a second target output, the second training input comprising a second training image representing a first ROI of the plurality of ROIs, and the second target output comprising second annotation data identifying one or more objects within the first ROI, the first ROI having a first ROI type of a plurality of ROI types; and providing the second training data to train a first object identification MLM of a plurality of object identification MLMs on a second set of training inputs comprising the second training input, and a second set of target outputs comprising the second target output, wherein the first object identification MLM is trained to identify objects in images of the first ROI type.

In clause 11, the method of clause 10, further comprising: generating third training data comprising a third training input and a third target output, the third training input comprising a third training image representing a second ROI of the plurality of ROIs, and the third target output comprising third annotation data identifying one or more objects within the second ROI, the second ROI having a second ROI type of the plurality of ROI types; and providing the third training data to train a second object identification MLM of the plurality of object identification MLMs on a third set of training inputs comprising the third training input, and a third set of target outputs comprising the third target output, wherein the second object identification MLM is trained to identify objects in images of the second ROI type.

In clause 12, the method of clause 10, wherein the first training image is a medical image of a patient.

In clause 13, a system comprising a memory device, and one or more processing devices, communicatively coupled to the memory device, to: apply an input image to a first machine learning model (MLM) to identify a plurality of regions of interest (ROIs) within the input image, wherein MLM is trained to identify the plurality of ROIs based, at least in part, on a plurality of reference features detected within the input image and one or more geometric relationships between each reference feature and one or more locations associated with an ROI type of a plurality of ROI types; and provide each of the identified plurality of ROIs as input to a respective one of a plurality of second MLMs to obtain an output of the respective second MLM, wherein the respective second MLM corresponds to one of the plurality of ROI types, and the output of the respective second MLM indicates one or more objects within an ROI of the corresponding ROI type.

In clause 14, the system of clause 13, wherein the input image is a multi-dimensional image of a first dimensionality, the first MLM is trained to detect the plurality of reference features based at least in part on processing a plurality of sectional images associated with the multi-dimensional image, each of the plurality of sectional images being of a second dimensionality and representing a section of the input image, and wherein the second dimensionality is lower than the first dimensionality.

In clause 15, the system of clause 14, wherein the first MLM is trained based on a plurality of training images having reference features of a type common with a type of the reference features within the input image.

In clause 16, the system of clause 13, wherein the input image is a medical image of a patient and the plurality of reference features are associated with one or more bones of the patient depicted by the input image.

In clause 17, the system of clause 16, wherein a first ROI of the plurality of ROIs comprises a representation of at least a portion of a first organ of the patient and excludes a representation of any portion of a second organ of the patient.

In clause 18, the system of clause 17, wherein the one or more processing devices comprise a graphics processing units.

In clause 19, a non-transitory computer-readable medium storing instructions thereon, wherein the instructions, when executed by a processing device, cause the processing device to: apply an input image to a first machine learning model (MLM) to identify a plurality of regions of interest (ROIs) within the input image, wherein MLM is trained to identify the plurality of ROIs based, at least in part, on a plurality of reference features detected within the input image and one or more geometric relationships between each reference feature and one or more locations associated with an ROI type of a plurality of ROI types; and provide each of the identified plurality of ROIs as input to a respective one of a plurality of second MLMs to obtain an output of the respective second MLM, wherein the respective second MLM corresponds to one of the plurality of ROI types, and the output of the respective second MLM indicates one or more objects within an ROI of the corresponding ROI type.

In clause 20, the non-transitory computer-readable medium of clause 19, wherein the input image is a multi-dimensional image of a first dimensionality, the first MLM is trained to detect the plurality of reference features based at least in part on processing a plurality of sectional images associated with the multi-dimensional image, each of the plurality of sectional images being of a second dimensionality and representing a section of the input image, and wherein the second dimensionality is lower than the first dimensionality.

In clause 21, the non-transitory computer-readable medium of clause 19, wherein the first MLM is trained based on a plurality of training images having reference features of a type common with a type of the reference features within the input image.

In clause 22, the non-transitory computer-readable medium of clause 19, wherein the input image is a medical image of a patient and the plurality of reference features are associated with one or more bones of the patient depicted by the input image.

In clause 23, the non-transitory computer-readable medium of clause 22, wherein a first ROI of the plurality of ROIs comprises a representation of at least a portion of a first organ of the patient and excludes a representation of any portion of a second organ of the patient.

Other variations are within spirit of present disclosure. Thus, while disclosed techniques are susceptible to various modifications and alternative constructions, certain illustrated embodiments thereof are shown in drawings and have been described above in detail. It should be understood, however, that there is no intention to limit disclosure to specific form or forms disclosed, but on contrary, intention is to cover all modifications, alternative constructions, and equivalents falling within spirit and scope of disclosure, as defined in appended claims.

Use of terms "a" and "an" and "the" and similar referents in context of describing disclosed embodiments (especially in context of following claims) are to be construed to cover both singular and plural, unless otherwise indicated herein or clearly contradicted by context, and not as a definition of a term. Terms "comprising," "having," "including," and "containing" are to be construed as open-ended terms (meaning "including, but not limited to,") unless otherwise noted. "Connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within range, unless otherwise indicated herein and each separate value is incorporated into specification as if it were individually recited herein. In at least one embodiment, use of term "set" (e.g., "a set of items") or "subset" unless otherwise noted or contradicted by context, is to be construed as a nonempty collection comprising one or more members. Further, unless otherwise noted or contradicted by context, term "subset" of a corresponding set does not necessarily denote a proper subset of corresponding set, but subset and corresponding set may be equal.

Conjunctive language, such as phrases of form "at least one of A, B, and C," or "at least one of A, B and C," unless specifically stated otherwise or otherwise clearly contradicted by context, is otherwise understood with context as used in general to present that an item, term, etc., may be either A or B or C, or any nonempty subset of set of A and B and C. For instance, in illustrative example of a set having three members, conjunctive phrases "at least one of A, B, and C" and "at least one of A, B and C" refer to any of following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, term "plurality" indicates a state of being plural (e.g., "a plurality of items" indicates multiple items). In at least one embodiment, number of items in a plurality is at least two, but can be more when so indicated either explicitly or by context. Further, unless stated otherwise or otherwise clear from context, phrase "based on" means "based at least in part on" and not "based solely on."

Operations of processes described herein can be performed in any suitable order unless otherwise indicated herein or otherwise clearly contradicted by context. In at least one embodiment, a process such as those processes described herein (or variations and/or combinations thereof) is performed under control of one or more computer systems configured with executable instructions and is implemented as code (e.g., executable instructions, one or more computer programs or one or more applications) executing collectively on one or more processors, by hardware or combinations thereof. In at least one embodiment, code is stored on a computer-readable storage medium, for example, in form of a computer program comprising a plurality of instructions executable by one or more processors. In at least one embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In at least one embodiment, code (e.g., executable code or source code) is stored on a set of one or more non-transitory computer-readable storage media having stored thereon executable instructions (or other memory to store executable instructions) that, when executed (i.e., as a result of being executed) by one or more processors of a computer system, cause computer system to perform operations described herein. In at least one embodiment, set of non-transitory computer-readable storage media comprises multiple non-transitory computer-readable storage media and one or more of individual non-transitory storage media of multiple non-transitory computer-readable storage media lack all of code while multiple non-transitory computer-readable storage media collectively store all of code. In at least one embodiment, executable instructions are executed such that different instructions are executed by different processors—for example, a non-transitory computer-readable storage medium store instructions and a main central processing unit ("CPU") executes some of instructions while a graphics processing unit ("GPU") executes other instructions. In at least one embodiment, different components of a computer system have separate processors and different processors execute different subsets of instructions.

Accordingly, in at least one embodiment, computer systems are configured to implement one or more services that singly or collectively perform operations of processes described herein and such computer systems are configured with applicable hardware and/or software that enable performance of operations. Further, a computer system that implements at least one embodiment of present disclosure is a single device and, in another embodiment, is a distributed computer system comprising multiple devices that operate differently such that distributed computer system performs operations described herein and such that a single device does not perform all operations.

Use of any and all examples, or exemplary language (e.g., "such as") provided herein, is intended merely to better illuminate embodiments of disclosure and does not pose a limitation on scope of disclosure unless otherwise claimed. No language in specification should be construed as indicating any non-claimed element as essential to practice of disclosure.

All references, including publications, patent applications, and patents, cited herein are hereby incorporated by reference to same extent as if each reference were individually and specifically indicated to be incorporated by reference and were set forth in its entirety herein.

In description and claims, terms "coupled" and "connected," along with their derivatives, may be used. It should be understood that these terms may be not intended as synonyms for each other. Rather, in particular examples, "connected" or "coupled" may be used to indicate that two or more elements are in direct or indirect physical or electrical contact with each other. "Coupled" may also mean that two or more elements are not in direct contact with each other, but yet still co-operate or interact with each other.

Unless specifically stated otherwise, it may be appreciated that throughout specification terms such as "processing," "computing," "calculating," "determining," or like, refer to action and/or processes of a computer or computing system, or similar electronic computing device, that manipulate and/or transform data represented as physical, such as electronic, quantities within computing system's registers and/or memories into other data similarly represented as physical quantities within computing system's memories, registers or other such information storage, transmission or display devices.

In a similar manner, term "processor" may refer to any device or portion of a device that processes electronic data from registers and/or memory and transform that electronic data into other electronic data that may be stored in registers and/or memory. As non-limiting examples, "processor" may be a CPU or a GPU. A "computing platform" may comprise one or more processors. As used herein, "software" processes may include, for example, software and/or hardware entities that perform work over time, such as tasks, threads, and intelligent agents. Also, each process may refer to multiple processes, for carrying out instructions in sequence or in parallel, continuously or intermittently. In at least one embodiment, terms "system" and "method" are used herein interchangeably insofar as system may embody one or more methods and methods may be considered a system.

In present document, references may be made to obtaining, acquiring, receiving, or inputting analog or digital data into a subsystem, computer system, or computer-implemented machine. In at least one embodiment, process of obtaining, acquiring, receiving, or inputting analog and digital data can be accomplished in a variety of ways such as by receiving data as a parameter of a function call or a call to an application programming interface. In at least one embodiment, processes of obtaining, acquiring, receiving, or inputting analog or digital data can be accomplished by transferring data via a serial or parallel interface. In at least one embodiment, processes of obtaining, acquiring, receiving, or inputting analog or digital data can be accomplished by transferring data via a computer network from providing entity to acquiring entity. In at least one embodiment, references may also be made to providing, outputting, transmitting, sending, or presenting analog or digital data. In various examples, processes of providing, outputting, transmitting, sending, or presenting analog or digital data can be accomplished by transferring data as an input or output parameter of a function call, a parameter of an application programming interface or interprocess communication mechanism.

Although descriptions herein set forth example embodiments of described techniques, other architectures may be used to implement described functionality, and are intended to be within scope of this disclosure. Furthermore, although specific distributions of responsibilities may be defined above for purposes of description, various functions and responsibilities might be distributed and divided in different ways, depending on circumstances.

Furthermore, although subject matter has been described in language specific to structural features and/or methodological acts, it is to be understood that subject matter claimed in appended claims is not necessarily limited to specific features or acts described. Rather, specific features and acts are disclosed as exemplary forms of implementing the claims.

What is claimed is:

1. A method comprising:
    applying an input image to a first machine learning model (MLM) to identify a plurality of regions of interest (ROIs) within the input image, wherein the first MLM is trained to identify the plurality of ROIs based, at least in part, on a plurality of reference features detected within the input image and one or more geometric relationships between each reference feature and one or more locations associated with an ROI type of a plurality of ROI types; and
    providing each of the identified plurality of ROIs as input to a respective one of a plurality of second MLMs to obtain an output of the respective second MLM, wherein the respective second MLM corresponds to one of the plurality of ROI types, and the output of the respective second MLM indicates one or more objects within an ROI of the corresponding ROI type.

2. The method of claim 1, wherein the input image is a multi-dimensional image of a first dimensionality, the first MLM is trained to detect the plurality of reference features based at least in part on processing a plurality of sectional images associated with the multi-dimensional image, each of the plurality of sectional images being of a second dimensionality and representing a section of the input image, and wherein the second dimensionality is lower than the first dimensionality.

3. The method of claim 1, wherein the first MLM is trained based on a plurality of training images having reference features of a type common with a type of the reference features within the input image.

4. The method of claim 1, wherein the first MLM comprises a neural network with at least one hidden layer.

5. The method of claim 1, wherein the input image is a medical image of a patient and the plurality of reference features are associated with one or more bones of the patient depicted by the input image.

6. The method of claim 5, wherein a first ROI of the plurality of ROIs comprises a representation of at least a portion of a first organ of the patient and excludes a representation of any portion of a second organ of the patient.

7. The method of claim 6, wherein a second ROI of the plurality of ROIs comprises the representation of at least a portion of the second organ.

8. The method of claim 1, wherein providing each of the plurality of ROIs to the respective one of the plurality of second MLMs comprises providing at least one of a location of the respective ROI within the input image or a representation of the respective ROI.

9. The method of claim 1, wherein applying the first MLM to the input image comprises executing one or more computations associated with the first MLM on one or more graphics processing units.

10. A method comprising:
    generating first training data comprising a first training input and a first target output, wherein the first training input comprises an intensity map of a first training image, and the first target output comprises first annotation data identifying a plurality of regions of interest (ROIs) in the first training image;

providing the first training data to train a segmentation machine learning model (MLM) on a first set of training inputs comprising the first training input, and a first set of target outputs comprising the first target output, wherein the segmentation MLM uses (i) the intensity map to identify a plurality of reference features within the first training image and (ii) the annotation data to identify one or more geometric relationships between each reference feature and one or more respective ROIs of the plurality of ROIs;

generating second training data comprising a second training input and a second target output, the second training input comprising a second training image representing a first ROI of the plurality of ROIs, and the second target output comprising second annotation data identifying one or more objects within the first ROI, the first ROI having a first ROI type of a plurality of ROI types; and providing the second training data to train a first object identification MLM of a plurality of object identification MLMs on a second set of training inputs comprising the second training input, and a second set of target outputs comprising the second target output, wherein the first object identification MLM is trained to identify objects in images of the first ROI type.

11. The method of claim 10, further comprising:

generating third training data comprising a third training input and a third target output, the third training input comprising a third training image representing a second ROI of the plurality of ROIs, and the third target output comprising third annotation data identifying one or more objects within the second ROI, the second ROI having a second ROI type of the plurality of ROI types; and providing the third training data to train a second object identification MLM of the plurality of object identification MLMs on a third set of training inputs comprising the third training input, and a third set of target outputs comprising the third target output, wherein the second object identification MLM is trained to identify objects in images of the second ROI type.

12. The method of claim 10, wherein the first training image is a medical image of a patient.

13. A system comprising:

a memory device; and one or more processing devices, communicatively coupled to the memory device, to:

apply an input image to a first machine learning model (MLM) to identify a plurality of regions of interest (ROIs) within the input image, wherein MLM is trained to identify the plurality of ROIs based, at least in part, on a plurality of reference features detected within the input image and one or more geometric relationships between each reference feature and one or more locations associated with an ROI type of a plurality of ROI types; and provide each of the identified plurality of ROIs as input to a respective one of a plurality of second MLMs to obtain an output of the respective second MLM, wherein the respective second MLM corresponds to one of the plurality of ROI types, and the output of the respective second MLM indicates one or more objects within an ROI of the corresponding ROI type.

14. The system of claim 13, wherein the input image is a multi-dimensional image of a first dimensionality, the first MLM is trained to detect the plurality of reference features based at least in part on processing a plurality of sectional images associated with the multi-dimensional image, each of the plurality of sectional images being of a second dimensionality and representing a section of the input image, and wherein the second dimensionality is lower than the first dimensionality.

15. The system of claim 13, wherein the first MLM is trained based on a plurality of training images having reference features of a type common with a type of the reference features within the input image.

16. The system of claim 13, wherein the input image is a medical image of a patient and the plurality of reference features are associated with one or more bones of the patient depicted by the input image.

17. The system of claim 16, wherein a first ROI of the plurality of ROIs comprises a representation of at least a portion of a first organ of the patient and excludes a representation of any portion of a second organ of the patient.

18. The system of claim 17, wherein the one or more processing devices comprise a graphics processing units.

19. A non-transitory computer-readable medium storing instructions thereon, wherein the instructions, when executed by a processing device, cause the processing device to:

apply an input image to a first machine learning model (MLM) to identify a plurality of regions of interest (ROIs) within the input image, wherein MLM is trained to identify the plurality of ROIs based, at least in part, on a plurality of reference features detected within the input image and one or more geometric relationships between each reference feature and one or more locations associated with an ROI type of a plurality of ROI types; and provide each of the identified plurality of ROIs as input to a respective one of a plurality of second MLMs to obtain an output of the respective second MLM, wherein the respective second MLM corresponds to one of the plurality of ROI types, and the output of the respective second MLM indicates one or more objects within an ROI of the corresponding ROI type.

20. The computer-readable medium of claim 19, wherein the input image is a multi-dimensional image of a first dimensionality, the first MLM is trained to detect the plurality of reference features based at least in part on processing a plurality of sectional images associated with the multi-dimensional image, each of the plurality of sectional images being of a second dimensionality and representing a section of the input image, and wherein the second dimensionality is lower than the first dimensionality.

21. The computer-readable medium of claim 19, wherein the first MLM is trained based on a plurality of training images having reference features of a type common with a type of the reference features within the input image.

22. The computer-readable medium of claim 19, wherein the input image is a medical image of a patient and the plurality of reference features are associated with one or more bones of the patient depicted by the input image.

23. The computer-readable medium of claim 22, wherein a first ROI of the plurality of ROIs comprises a representation of at least a portion of a first organ of the patient and excludes a representation of any portion of a second organ of the patient.

* * * * *